(12) United States Patent
Schnebly et al.

(10) Patent No.: US 6,388,404 B1
(45) Date of Patent: May 14, 2002

(54) REMOTE CONTROLLED WINDOW TREATMENT AND/OR LIGHTING SYSTEM

(75) Inventors: John T. Schnebly, Wynantskill; Kevin C. Martin, Stillwater; Randy Koleda, Gansevoort, all of NY (US); Leo Litto, Venice, FL (US)

(73) Assignee: Decotex 2000 Corporation, Cohoes, NY (US)

( * ) Notice: Subject to any disclaimer, the term of this patent is extended or adjusted under 35 U.S.C. 154(b) by 926 days.

(21) Appl. No.: 08/583,588

(22) Filed: Jan. 5, 1996

Related U.S. Application Data

(63) Continuation of application No. 08/367,771, filed on Jan. 3, 1996, now abandoned.

(51) Int. Cl.⁷ .................................................. H02F 1/00
(52) U.S. Cl. ......................................................... 318/16
(58) Field of Search ........................... 318/16, 280–286, 318/466–472, 266, 267; 49/25, 26, 29, 30, 139; 160/291, 292, 293.1, DIG. 17

(56) References Cited

U.S. PATENT DOCUMENTS

| | | | |
|---|---|---|---|
| 2,572,720 A | 10/1951 | Goodman | |
| 3,271,568 A | 9/1966 | Lundberg | |
| 3,294,152 A | 12/1966 | Kuijvenhoven | |
| 3,310,099 A | 3/1967 | Hunter et al. | |
| 3,646,985 A | 3/1972 | Klann | |
| 4,265,142 A | 5/1981 | Watanabe | |
| 4,440,050 A | 4/1984 | Kagerer | |
| 4,471,275 A | * 9/1984 | Comeau | 318/286 |
| 4,544,866 A | * 10/1985 | Clemmons et al. | 318/469 |
| 4,550,759 A | 11/1985 | Archer | |
| 4,618,804 A | 10/1986 | Iwasaki | |
| 4,644,990 A | 2/1987 | Webb, Sr. et al. | |
| 4,712,104 A | 12/1987 | Kobayashi | |
| 4,773,464 A | 9/1988 | Kobayashi | |
| 4,958,112 A | * 9/1990 | Zerillo | 318/280 |
| 4,979,550 A | 12/1990 | Long et al. | |
| 4,979,552 A | 12/1990 | van der Zanden | |
| 5,187,472 A | * 2/1993 | Hart et al. | 340/825.69 |
| 5,226,724 A | 7/1993 | Kanarek | |
| 5,247,232 A | * 9/1993 | Lin | 318/286 |
| 5,391,967 A | 2/1995 | Domel et al. | |
| 5,413,161 A | 5/1995 | Corazzini | |
| 5,444,339 A | 8/1995 | Domel et al. | |

* cited by examiner

*Primary Examiner*—Anthony Wysocki
(74) *Attorney, Agent, or Firm*—Lowe Hauptman Gilman & Berner, LLP

(57) ABSTRACT

An improved window covering and lighting system for a window in a room includes a plurality of cornices, each cornice including a window covering supported by the cornice and movable between an open position and a closed position, an actuator supported by the cornice for moving the window covering between the open position and the closed position, a lighting system mounted to the cornice, and a programmable logic unit for operating at least one of the actuator and the lighting system independently from one another upon demand. The system also includes a remote control unit providing a signal selectively to the programmable logic unit to operate at least one of the plurality of cornices. Each of the plurality of cornices further includes a light sensor for sensing ambient light conditions in the room, and a motion detector for detecting occupance of the room. The programmable logic control unit is responsive to the sensed ambient light conditions and the detected occupance.

38 Claims, 17 Drawing Sheets

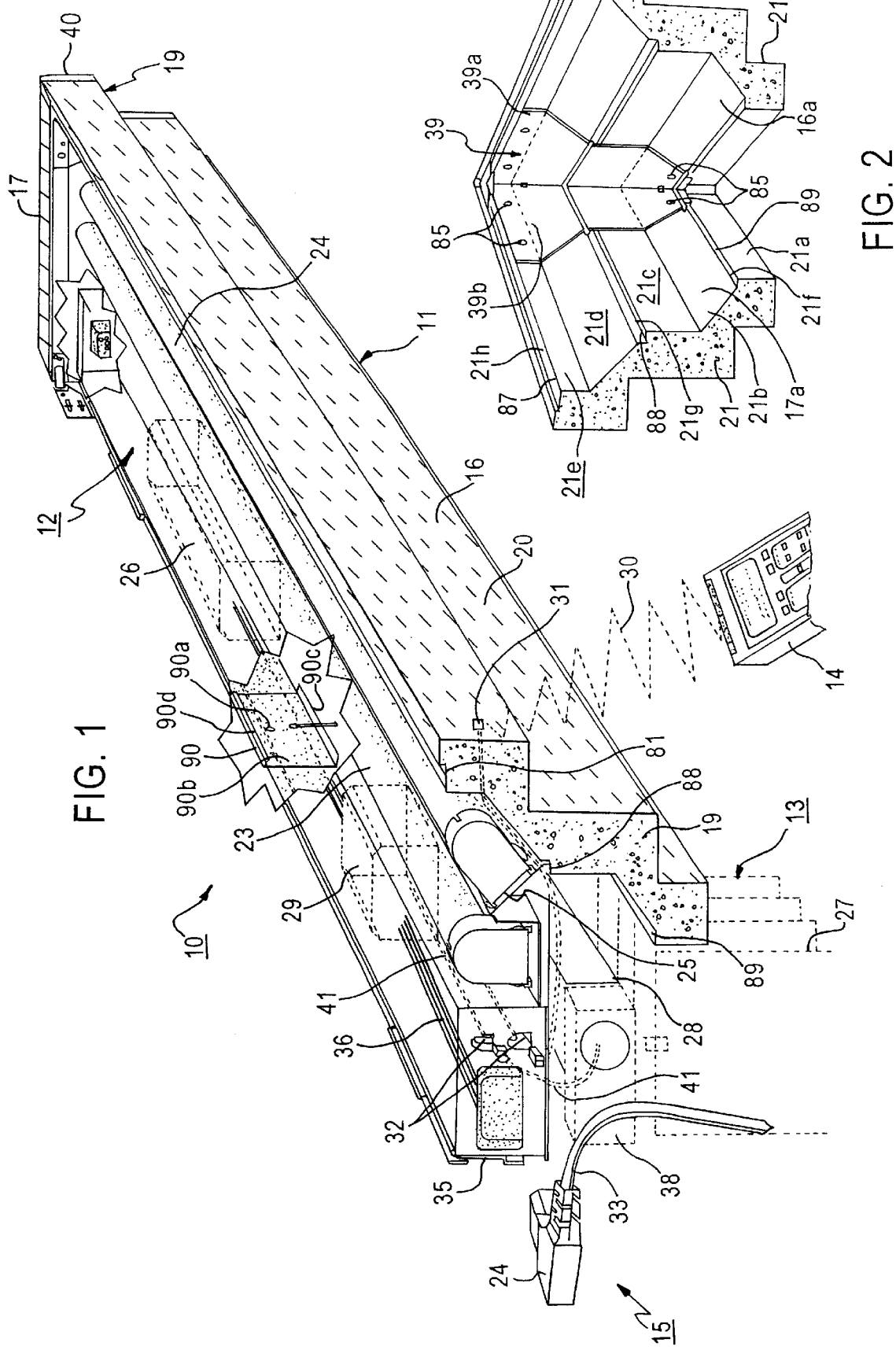

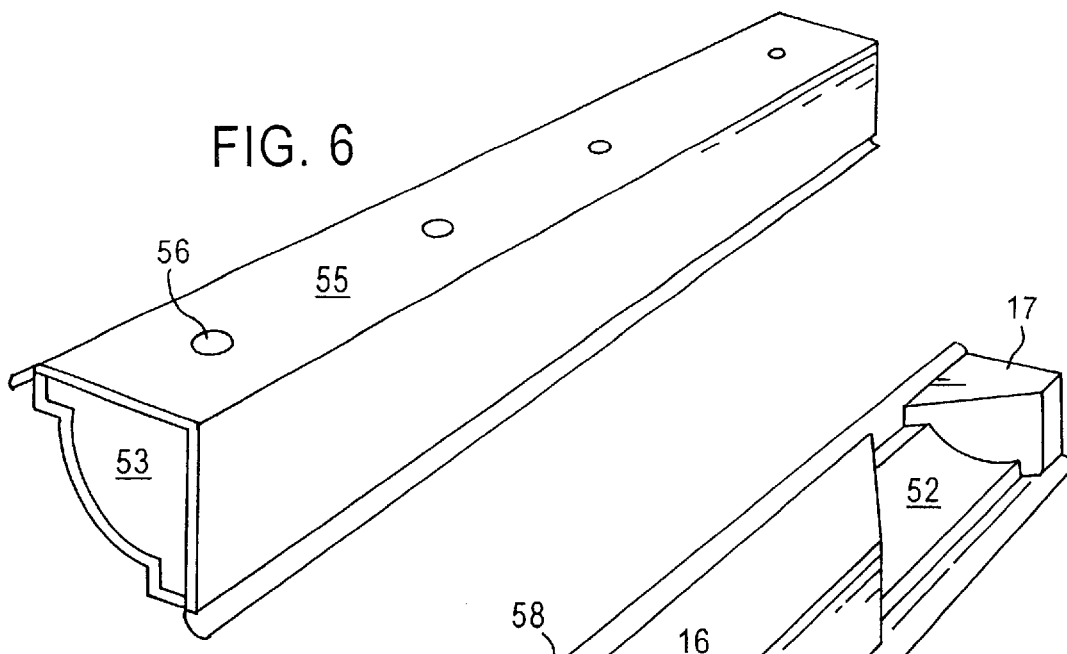
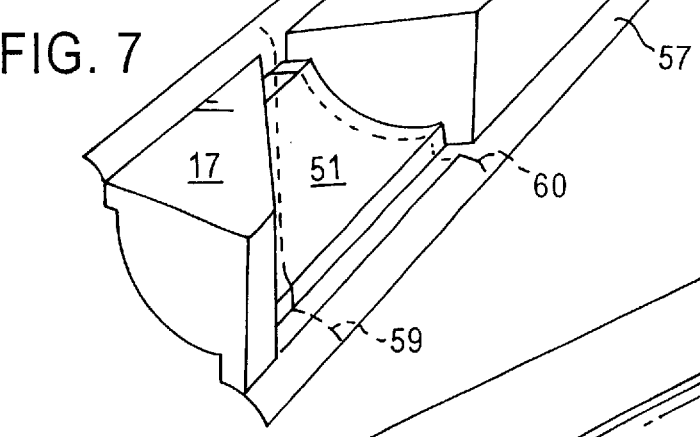
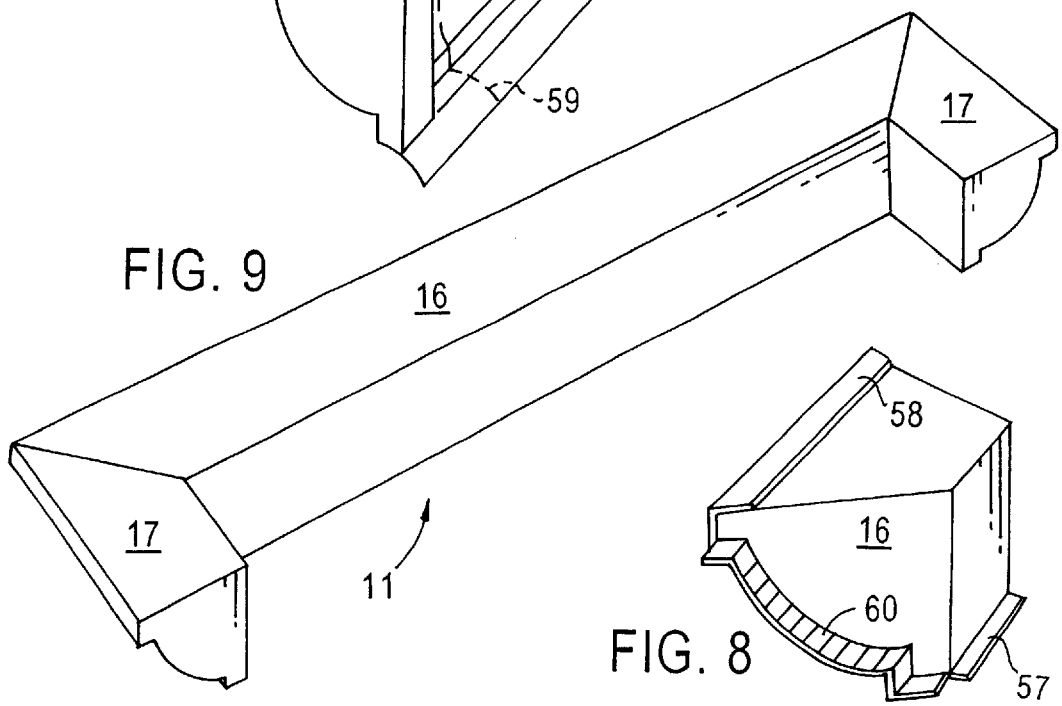

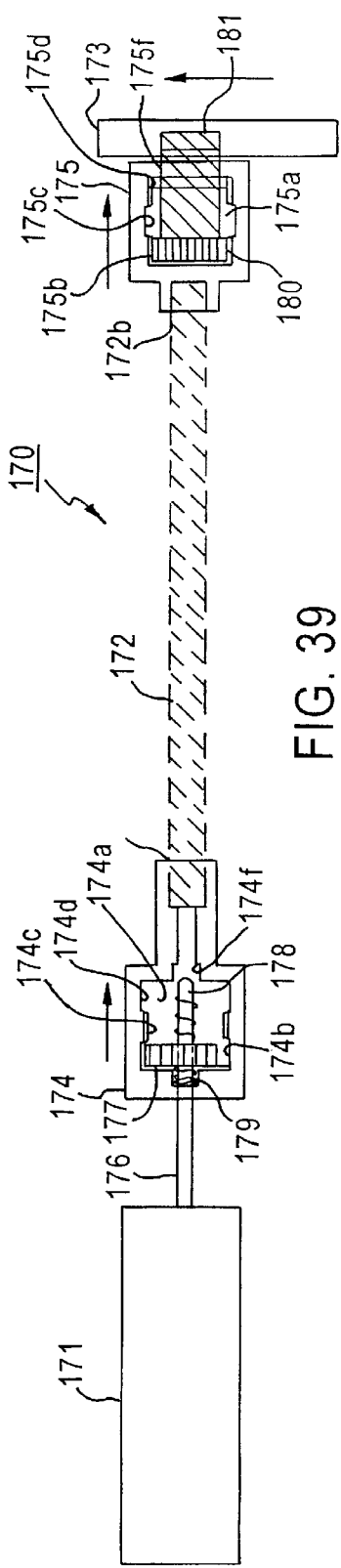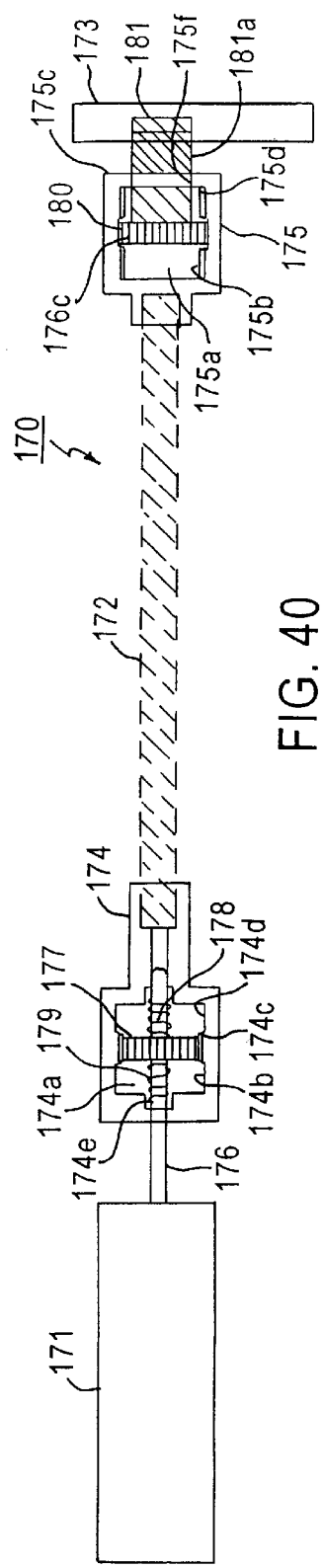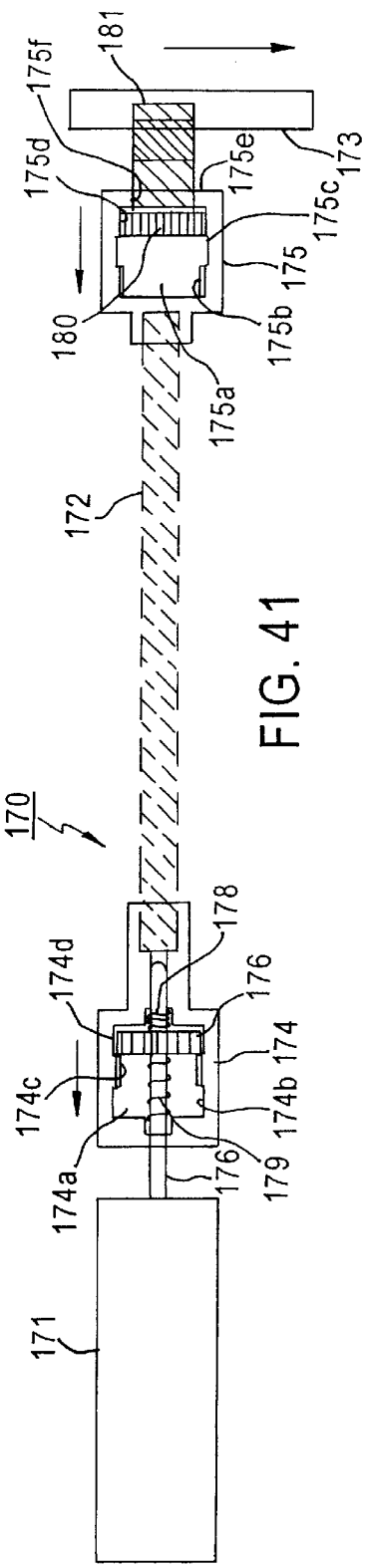

REMOTE CONTROLLED WINDOW TREATMENT AND/OR LIGHTING SYSTEM

RELATED APPLICATIONS

This application is a continuation application of Ser. No. 08/367,771, filed Jan. 3, 1996, and now abandoned.

TECHNICAL FIELD

The present invention relates generally to a window treatment system and, more particularly, to a remote control window treatment and lighting system.

BACKGROUND ART

Numerous window treatments have been provided in the prior art that are adapted to be mounted onto window coverings, including, for instance, draperies, roller shades, venetian blinds, vertical blinds, etc. A number of arrangements have been proposed for motorized window treatment systems. Such systems are often responsive to light conditions in a room. Among these systems is the motorized venetian blind disclosed in U.S. Pat. No. 3,646,985 to Klann. In Klann, the motorized venetian blind includes a motor tipping the slats of the blinds one way or another to automatically control the amount of light admitted into a room as detected by a control circuit having a photosensitive device in the room.

Other known systems are activated by a timer. For instance, U.S. Pat. No. 5,413,161 to Corazzini discloses a solar powered window shade comprising a venetian blind and an apparatus for converting solar radiation into electrical energy. The electrical energy is utilized to open and close the blind. The window shade further utilizes a timer to open and close the blind at preprogrammed time intervals. Also provided is a light which can be energized at night to make it appear that the building is occupied.

It is also known to use a remote control system for operating a window treatment, such as disclosed in U.S. Pat. No. 4,618,804 to Iwasaki, wherein a remote control system for bidirectionally rotating an electric motor is used for opening and closing a blind. Similarly, U.S. Pat. No. 4,712,104 to Kobayashi discloses a remote control system for window blinds including a control unit for each of a plurality of blinds which are opened and closed freely. Two or more of the blinds may be controlled at the same time from a distance. Furthermore, U.S. Pat. No. 5,444,339 to Domel et al. discloses a motorized mini-blind actuator. A control signal generator generates a control signal for actuating the mini-blind. The control signal is generated in response to a predetermined amount of daylight or in response to a user-generated remote command signal.

One example of prior art systems combining lighting systems with a window covering, is disclosed in U.S. Pat. No. 3,271,568 to Lundberg, wherein a window shade is provided with a valance including a florescent lamp. The apparatus is controlled by a wall switch.

One of the drawbacks to the foregoing prior art systems is that the motors and other components are often large and difficult to conceal. Hence, the components are undesirably visible to an occupant of the room.

Accordingly, with any of the window treatments described herein, it is often desired to install a decorative cornice concealing the mounting and operational hardware of the window treatment from view.

Such cornices are typically somewhat expensive and require custom installation due to variances in window treatments and sizes. The window and window treatment must be measured by a professional visiting the site, the size of the cornice calculated based on the resulting measurements, and the cornice custom ordered to be of the proper size. A professional must be utilized to properly install the custom ordered cornice. Thus, the prior art custom sized cornice is expensive, and cost often prohibits the installation of decorative cornices.

Both motors and lighting systems require electrical power for operation. Such electrical power is typically provided by hard wiring the motor or lighting system to the building electrical system in the walls. This type of power system requires a licensed electrician for installation. Again, for the average homeowner, the cost often prohibits the installation of such devices.

It is thus desirable to provide an improved remote control window treatment and lighting system which is economical, versatile, provides a dimmable lighting system, can be programmed to respond to various conditions in the room, and can be manually overridden if so desired.

It is also desirable to provide a power cord permitting installation by a "do-it-yourself" homeowner of a decorative cornice incorporating such features as motorized window treatments and lighting systems without requiring the services of a licensed electrician, the power cord adapted for insertion into a standard wall outlet.

It is further desirable to provide an extension power cord providing electrical power between a plurality of decorative cornices incorporating such features as motorized window treatments and lighting systems.

It is also desirable to provide an improved decorative cornice that is inexpensive to manufacture, that can be sized to a particular window and window treatment without requiring custom ordering, and that can be easily and accurately installed by a "do-it-yourself" homeowner at the installation site.

DISCLOSURE OF THE INVENTION

Accordingly, one advantage of the present invention is in providing an improved remote control window treatment and lighting system that is economical and affordable to the average homeowner, yet versatile.

Another advantage of the present invention is in providing an improved remote control window treatment and lighting system with the capability of providing variable lighting, which can be programmed to respond to various conditions in the room, and which can be manually overridden if so desired.

These and other advantages are achieved, at least in part, by providing an improved window covering and lighting system for a window in a room in accordance with the present invention. The system includes a cornice mounted to a wall supporting a window covering movable between an open position and a closed position. An actuator is operatively associated with the cornice for moving the window covering between the open position and the closed position. A lighting system, preferably comprising a dimmable ballast operatively attached to at least one fluorescent lamp, is operatively associated with the cornice. A programmable logic control unit operates the actuator and the lighting system independently from one another upon demand.

The system preferably includes a remote control unit providing a signal to the logic control unit. The logic control unit operates at least one of the actuator and light system responsive to the signal. Preferably, the signal is an infrared signal transmitted from the remote control unit and received by an infrared sensor mounted to the cornice. Also preferably, the remote control unit transmits a signal to program the logic control unit.

According to one aspect of the invention, the system further includes a light sensor for sensing ambient light conditions in the room, and a motion detector for detecting occupancy of the room. The programmable logic control unit is responsive to the sensed ambient light conditions and the detected occupancy.

According to another aspect of the invention, the system further includes a means for manually overriding the programmable logic control unit for operating at least one of the lighting system or the actuator. Preferably, the overriding means comprises a signal transmitted from the remote control unit to the programmable logic control unit.

Also preferably, the logic control unit actuates the window covering responsive to ambient light conditions in the room, in which case the system further includes a sensor for sensing the ambient light conditions in the room.

Also preferably, the logic control unit actuates the lighting system responsive to occupancy of the room, in which case an occupancy sensor is provided, operatively connected to the logic control unit for providing a signal indicating occupancy to the logic control unit. Preferably, the occupancy sensor is an passive infrared detector or a motion detector.

According to another aspect of the invention, a power cord is operatively secured to at least one of the lighting system, the actuator and the logic control unit for supplying power to the system.

According to a further aspect of the invention, the cornice is modular and includes a front panel, a pair of side panels, and a pair of corner joining assemblies joining the front panel with each of the side panels.

Optionally, the cornice may include a plurality of shelves on the back side thereof for supporting at least one of a diffuser and a dust cover.

According to another embodiment of the present invention, an improved window covering and lighting system for a window in a room comprises a plurality of cornices. Each cornice is mounted to a wall in the room and includes a window covering supported by the cornice and movable between an open position and a closed position. An actuator is operatively associated with the cornice for moving the window covering between the open position and the closed position. A lighting system, preferably comprising a dimmable ballast operatively attached to at least one fluorescent lamp, is operatively associated with the cornice. A programmable logic control unit is provided for operating at least one of the actuator and the lighting system independently from one another upon demand. Also provided is a remote control unit providing a signal selectively to at least one of the logic control units of at least one of the plurality of cornices, the logic control units being responsive to the signal.

Preferably, the signal is an infrared signal transmitted from the remote control unit and received by an infrared sensor mounted to each of the plurality of cornices. The remote control unit provides a focused infrared signal received by only one of the infrared sensors mounted on the plurality of cornices to operate only one of the plurality of cornices, and provides a wide area infrared signal received by all of the infrared sensors mounted on the plurality of cornices to activate the plurality of cornices simultaneously.

Preferably, each of the plurality of cornices further comprises a light sensor for sensing ambient light conditions in the room, and a motion detector for detecting occupancy of the room, and wherein the programmable logic control unit is responsive to the sensed ambient light conditions and the detected occupancy.

Also preferably, a means is provided for manually overriding the programmable logic control unit for operating at least one of the lighting system or the actuator.

Again, preferably each cornice includes a front panel, a pair of side panels and a pair of corner joining assemblies joining the front panels with each of the pair of side panels. Each corner joining assembly comprises a bracket including a first face and a second face disposed at 90° from the first face. The first face is secured to a back side of the front panel and the second face is secured to a back side of one of the pair of side panels. The first and second faces are joined at an inside edge. The inside edge includes at least one hole disposed therein. The joining assembly further comprising a welt disposed between the front panel and the one of the pair of side panels and securely received in the at least one hole.

Optionally, the front panel includes two modular panels joined by a splicer.

According to another aspect of the invention, a power cord is provided operatively secured to at least one of the lighting system, the actuator and the logic control unit in at least one of the cornices for supplying power to the system. According to a further aspect of the invention, an extension power cord is provided including a male receptacle on one end thereof adapted to be inserted in a female receptacle operatively connected to one of the cornices. A female receptacle is provided on the other end thereof adapted to be inserted in a male receptacle operatively connected to another of the cornices.

BRIEF DESCRIPTION OF DRAWINGS

FIG. 1 is a schematic perspective view of a preferred embodiment of the system of the present invention;

FIG. 2 is a perspective view of the system of FIG. 1 from the rear inside corner;

FIG. 6 is a representation of the closed injection mold of the present invention;

FIG. 7 depicts the molded sections of the decorative valance of the present invention;

FIG. 8 illustrates a cut side panel of the decorative valance of the present invention;

FIG. 9 depicts the assembled decorative valance of the present invention;

FIGS. 39–41 depict a unique clutch for a motorized window treatment of the present invention.

BEST MODE FOR CARRYING OUT THE INVENTION

A. System Overview

Figure 3:
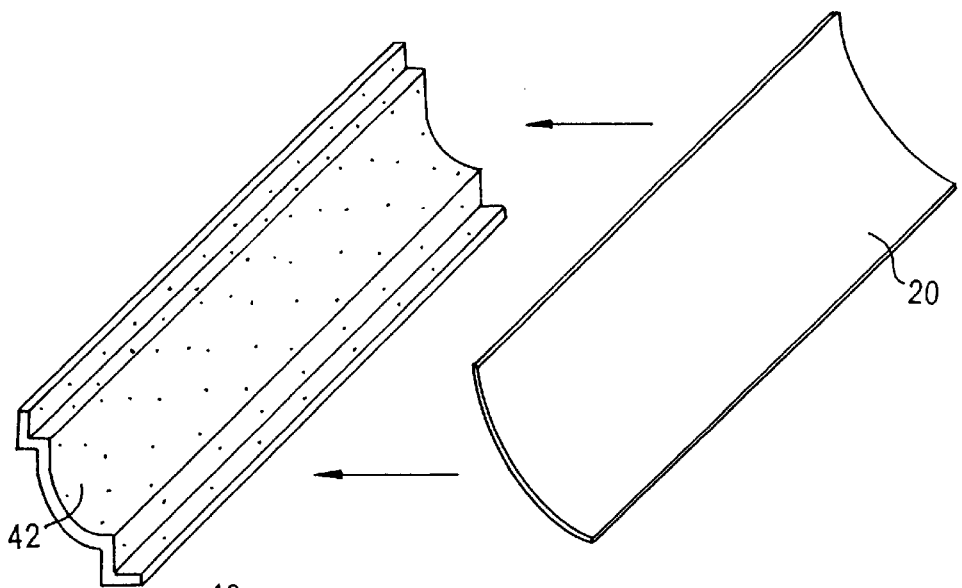
FIG. 3 is a schematic representation of vacuum profiling of the present invention.
Figure 4:
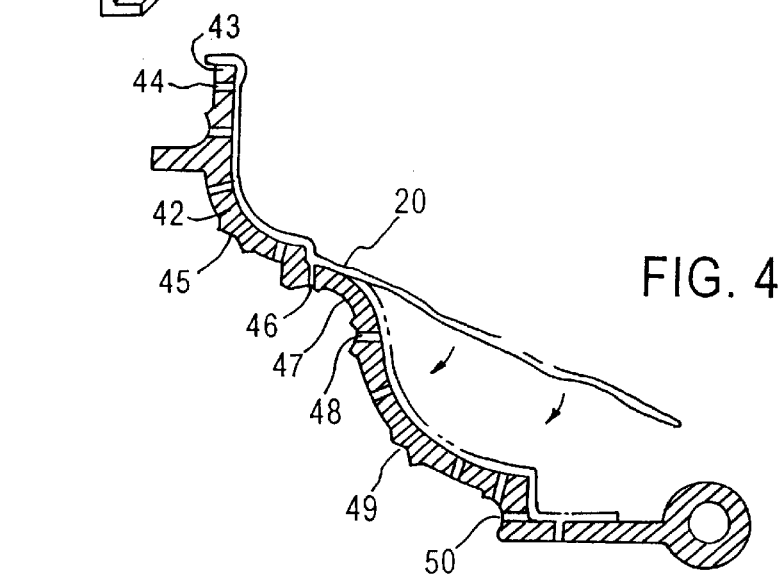
FIG. 4 is a cross-sectional representation of sequential vacuum profiling.

Referring to FIGS. 1 and 2, the remote control window treatment/lighting system of the present invention, generally identified by reference numeral 10, includes a cornice 11 to which a motorized window treatment 13 (depicted as a vertical blind) is mounted. A lighting system 12, preferably secured to the wall, is supported by cornice 11. A power system 15 provides power to the motorized window treatment 13 and the lighting system 12. A remote control unit 14 permits programming of a logic control unit 29 controlling the lighting system and the motorized window treatment 13.

In accordance with the unique features described in more detail below, cornice 11 includes a front panel 16, a right side panel 17, a left side panel 18 (removed in FIG. 1), and a corner joiner assembly 19 (best seen in FIG. 2). Each front and side panel 16, 17, 18 is made from a soft upholstery thermoformed foam core 21 covered with a decorative fabric or wallpaper material 20.

Lighting system 12 includes one or more fluorescent lights 23, 24 supported by a light system support bracket assembly 25 and powered by a dimmable ballast 26. Window treatment 13 includes a window covering 27 supported by and operatively connected to a rod 28 in a conventional manner appropriate to the type of window treatment utilized. The window treatment may be, for instance, a drapery, a roller shade, a venetian blind, a vertical blind, etc.

Remote control unit 14 emits an infrared signal 30 received by an infrared sensor 31. The signal received by sensor 31 is transmitted to the logic control unit 29 via a plurality of wire cables 41 operatively connected to one another by a telephone-like modular jack 32. Logic control unit 29 is an infrared activated control unit, responsive to the infrared signal 30. As will be described in more detail below with reference to a preferred embodiment, remote control unit 14 permits programming of the system 10 responsive to changes in occupancy in the room and/or external lighting conditions; additionally, remote control unit 14 permits manual override of the system programming as desired.

Power system 15 comprises a unique power cord 33 (see also FIG. 27) including a female receptacle 34 at one end thereof for insertion in a male receptacle 35 located in the vicinity of the logic control unit 29 and supplying power to logic control unit 29 via conventional wiring 36. At the other end of power cord 34 is a standard male receptacle 37 (FIG. 27) for insertion into a standard wall outlet. According to a unique feature of the invention, described in more detail below, power cord 33 includes a recess 33a, best seen in FIG. 30, adapted to receive one side of double-sided foam tape 33b therein. The other side of double sided foam tape 33b is pressed against the wall or window molding to secure the power cord 33 to the wall or molding. Preferably, the tape 33b is pressed against the window molding to hide the power cord 33 from view behind the window treatment 13.

As an alternative to the power system 15, logic control unit 29 may be directly wired to the building electrical system. Logic control unit 29 in turn supplies power to a reversible motor 38 for actuation of the window covering 27 upon command from the logic control unit 29.

These and other features of the present invention will be discussed in more detail below.

B. Cornice

As stated above, cornice 11 uniquely includes front panel 16, right and left side panels 17, 18, joined by corner joiner assembly 18. As will be described, this modular feature permits custom installation of the cornice on site with minimal aggravation.

Figure 11:
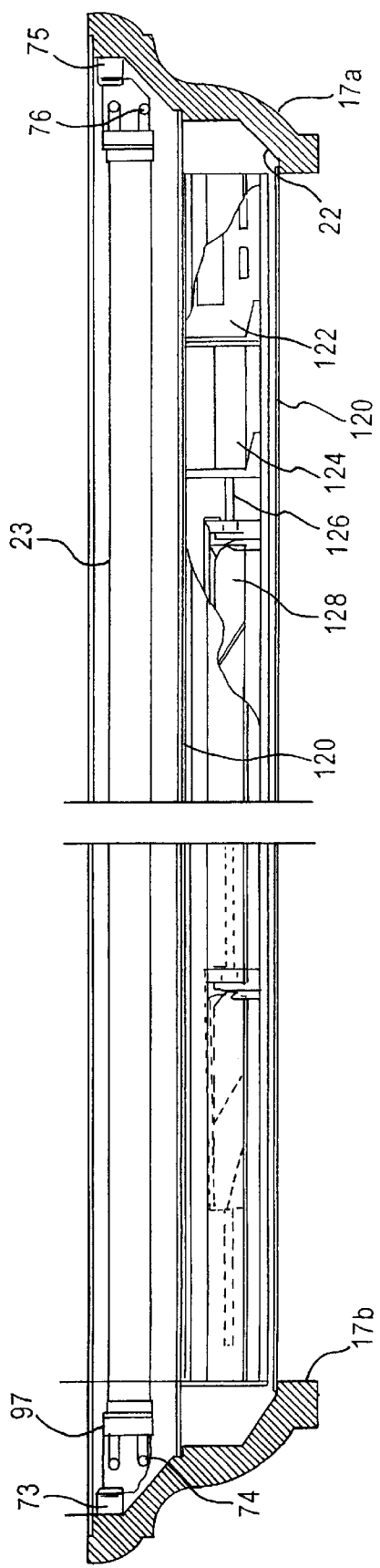
FIG. 11 is a sectional view taken along lines 4—4 of FIG. 3.
Figure 12:
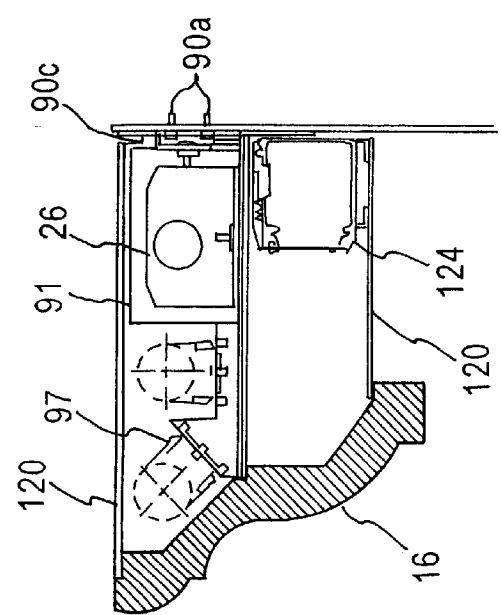
FIG. 12 is a sectional view taken along lines 5—5 of FIG. 3.
Figure 31:
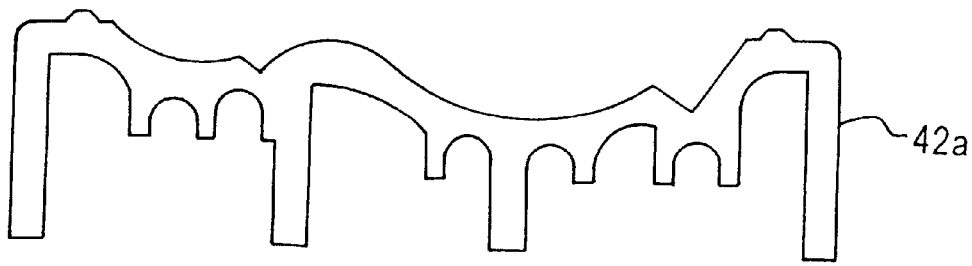
FIGS. 31 and 32 depict variations of the cornice mold face according to the present invention.
Figure 32:
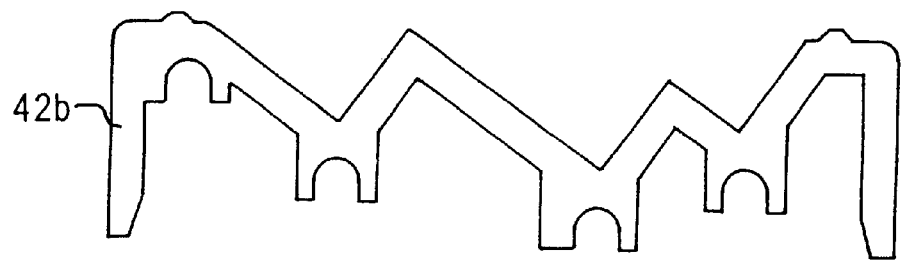

As will become apparent, the face of cornice 11 may be modified to fit a particular decor. For instance, cornice 11 may be of a modern style, as depicted in FIGS. 1 and 2, a colonial style, as depicted in FIGS. 11 and 12, or a southwestern style. Because the cornice 11 of the present invention is preferably molded, the different styles of cornice 11 are achieved by varying the mold front of the cornice. Compare, for instance, FIG. 31 depicting a colonial style mold front with the southwestern style mold front depicted in FIG. 32. It is preferred that, regardless of the style of the face of cornice 11, a uniform mold back 129 be used, depicted in FIG. 33. The provision of a uniform mold back 129 advantageously permits the installation of the same system components with any of the mold fronts, thereby minimizing costs.

The front panel 16 is secured to side panels 17 and 18 by a miter joint. This permits the custom sizing of the cornice 11 at the installation site by simply cutting the front panel 16 to the desired size in a 45° cut utilizing a simple compound miter saw. The side panels 17, 18 may similarly be cut at the installation site, or alternatively, side panels of a uniform size may be provided.

Figure 17:
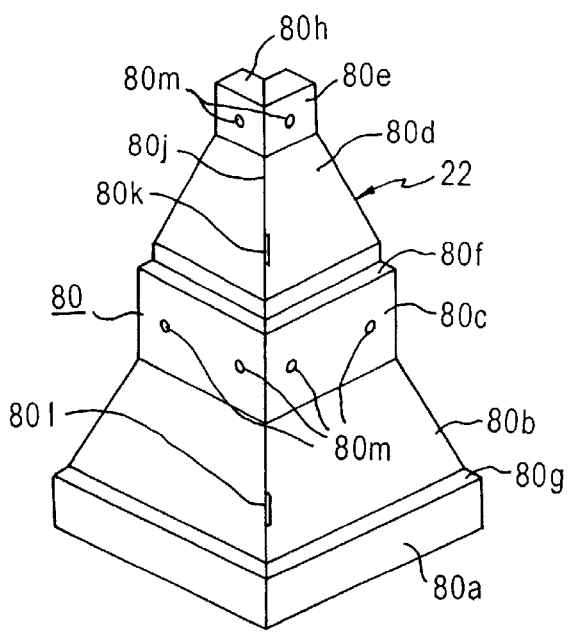
FIG. 17 is a perspective view of an corner bracket for the cornice of the present invention.
Figure 18:
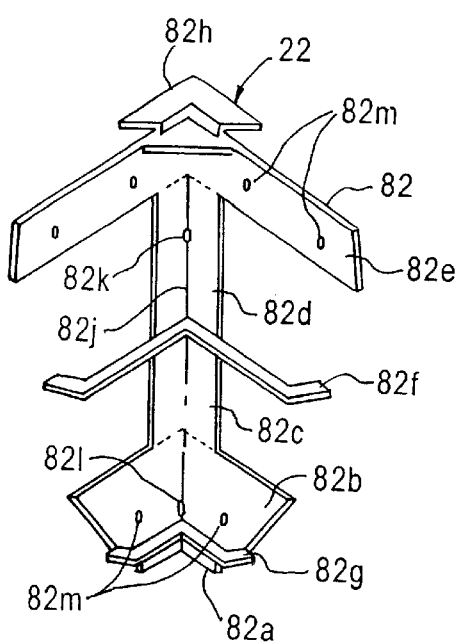
FIG. 18 is a perspective view of a first alternate embodiment of a corner bracket for the cornice of the present invention.
Figure 19:
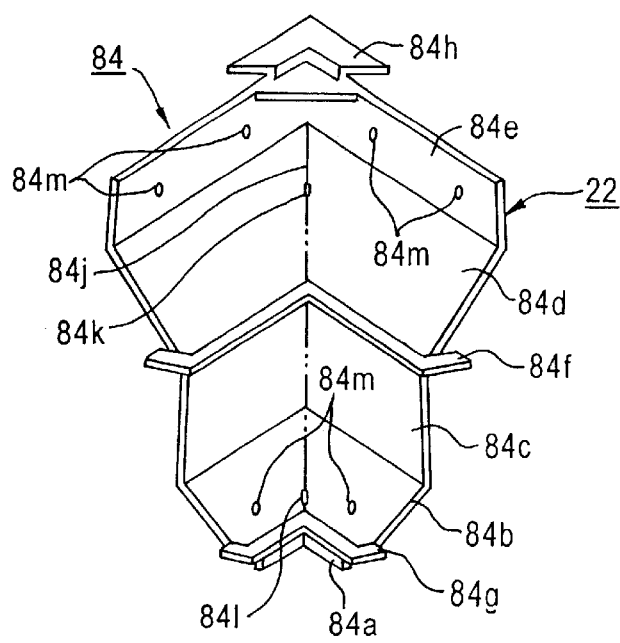
FIG. 19 is a perspective view of a second alternate embodiment of a corner bracket for the cornice of the present invention.

Corner joiner assembly 19 comprises an inner joiner component 39 preferably a connecting angle or gusset, disposed on the cornice inside corner (FIG. 2) and an outer joiner component 40 in the form of a welt disposed on the cornice outside corner. FIGS. 17 through 19 depict alternate embodiments of the inner joiner component 39 of corner joiner assembly 18 utilized for joining the front panel 16 to the side panels 17, 18. In each embodiment, a first surface 39a of the inner joiner component 39 is configured to seat against the inside surface 16a of the front panel 16, while a second surface 39b of inner joiner component 39, disposed at 90° from first surface 39a, is configured to seat against the inside surface 17a, 18a of right and left side panels 17, 18 respectively.

Figure 33:
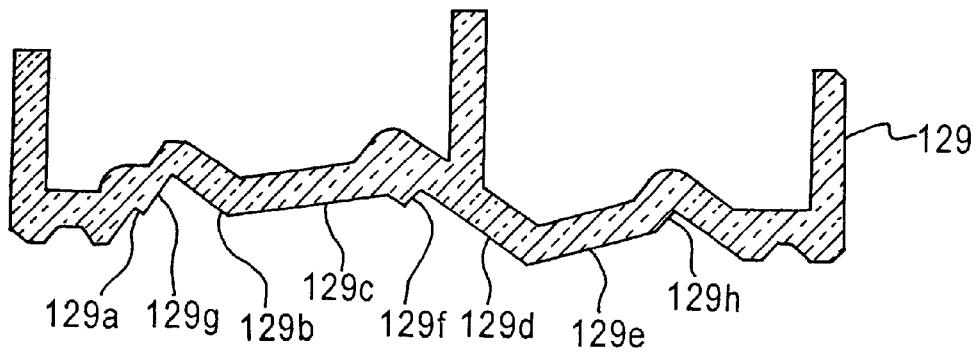
FIG. 33 depicts a preferred embodiment of the cornice mold back according to the present invention.

FIG. 18 depicts an inside corner miter bracket 82, particularly suited to being formed by a die casting process. Bracket 82 is contoured to fit securely and flatly against the inside surface 16a, 17a, 18a of panels 16, 17, 18. Referring to FIG. 33, mold back 129 includes a lower vertical surface 129a and a lower slanted surface 129b emanating upwardly from lower vertical surface 129a. A reduced middle vertical surface 129c is disposed between lower slanted surface 129b and a reduced upper slanted surface 129d, with reduced upper slanted surface 192d transitioning to an upper vertical surface 129e, which terminates in an upper horizontal surface 129h. A lower horizontal surface 129g disposed between lower vertical surface 129a and lower slanted surface 129b provides a shelf surface, as does a middle horizontal surface 192f disposed between upper slanted surface 192e and middle vertical surface 128d. During the molding process described below, foam is injected against mold back 129 to form foam core 21. Hence, referring to FIG. 2, foam core 21 will include surfaces 21a–21h corresponding to surfaces 129a–129h, respectively, of mold back 129.

Referring to FIG. 18, it can be seen that bracket 82 generally follows the above-described contour. Specifically, bracket 82 includes a lower vertical surface 82a and a lower slanted surface 82b emanating from lower vertical surface. A reduced middle vertical surface 82c is disposed between lower slanted surface 82b and a reduced upper slanted surface 82d. Reduced upper slanted surface 82d transitions into an upper vertical surface 82e. Disposed between upper slanted surface 82d and middle vertical surface 82c is a middle shelf 82f. A lower shelf 82g is provided between lower slanted surface 82b and lower vertical surface 82a. An upper horizontal surface 82h is provided for further stabilization. Upper horizontal surface 82h may also function as a shelf. Inside corner miter bracket 82 further includes an inside edge 82j including a pair of holes 82k, 82l. The purposes of shelves 82g, 82h and holes 82k, 82l will be hereinafter described. A plurality of holes 82m are disposed on upper vertical surface 82e and lower slanted surface 82b, enabling the bracket 82 to be secured to inside surfaces 16a, 17a, 18a of panels 16, 17, 18 with conventional screws 85, as depicted in FIG. 2.

FIG. 19 depicts another alternative inside corner miter bracket 84, also particularly suited to formation by a die casting process. Again, bracket 84 includes a contour approximating the surfaces 21a–21h of foam core 21 provided by surfaces 129a–129h of back mold 129. Bracket 84 includes a lower vertical surface 84a, a lower slanted surface 84b, a reduced middle vertical surface 84c, a reduced upper slanted surface 84d and an upper vertical surface 84e. Disposed between upper slanted surface 84d and middle vertical surface 84c is a middle shelf 84f. A lower shelf 84g is provided between lower slanted surface 84b and lower vertical surface 84a. An upper horizontal surface 84h is provided for further stabilization. Upper horizontal surface 84h may also function as a shelf. Inside corner miter bracket 84 further includes an inside edge 84j including a pair of holes 84k, 84l. The purposes of shelves 84g, 84h and holes 84k, 84l will be hereinafter described. A plurality of holes 84m are disposed on upper vertical surface 84e and lower slanted surface 84b, enabling the bracket 84 to be secured to inside surfaces 16a, 17a, 18a of panels 16, 17, 18 with conventional screws 85, as depicted in FIG. 2. It will be appreciated by one of ordinary skill in the art that while bracket 84 is of a more robust construction, and thus is sturdier, than bracket 82 of FIG. 18, bracket 82 is more economical to manufacture and hence is particularly suitable for use with lower cost remote control window treatment/lighting systems 10.

Figure 34:
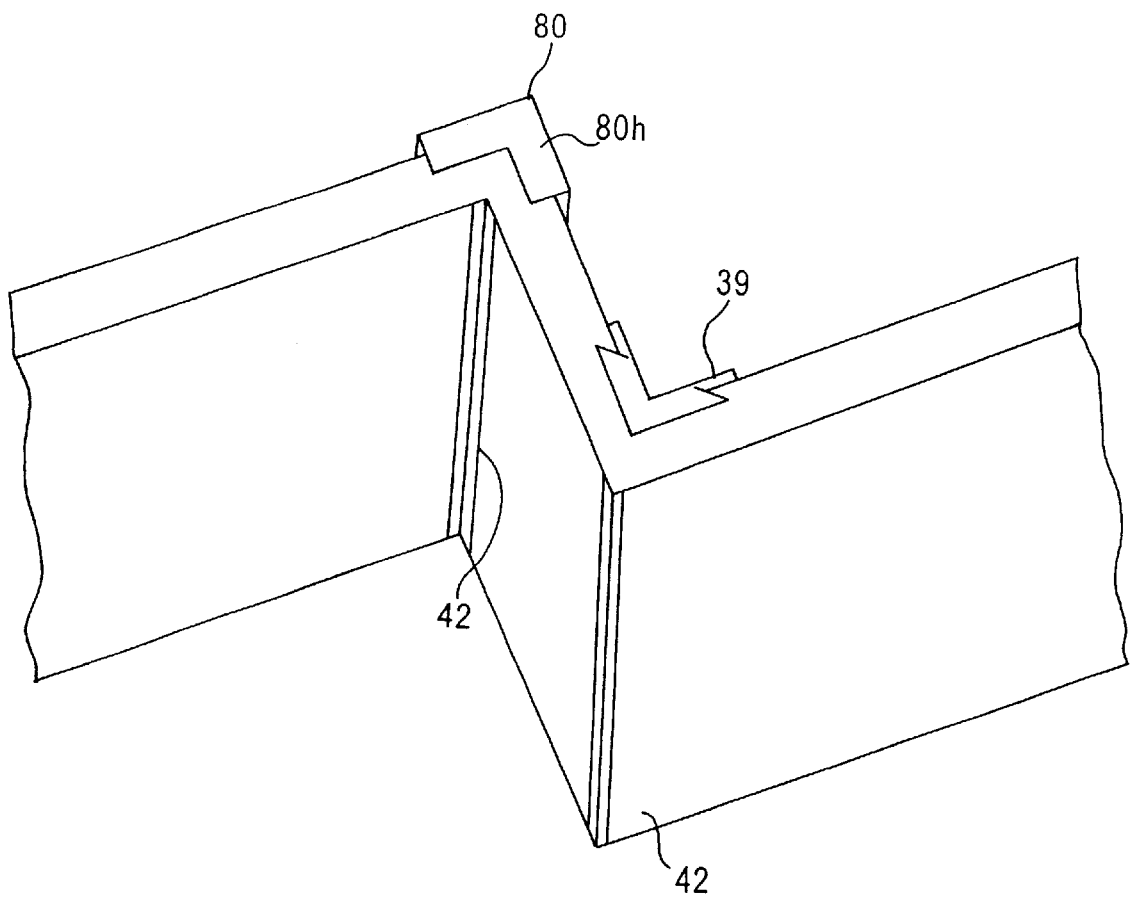
FIG. 34 is a schematic depiction of inside and outside corners of the cornice of the present invention.

FIG. 17 depicts an inside corner miter bracket 80 adapted for use on an inside corner, such as schematically depicted in FIG. 34. This type of corner may be utilized on a cornice extending around one or more inside corners of a room, or alteratively, around a soffit in, for instance, a kitchen. Bracket 80 is again particularly suited to being formed by a die casting process and also is adapted to conform to the contour of back mold 129. Bracket 80 includes a lower vertical surface 80a, a lower slanted surface 80b, a middle vertical surface 80c, an upper slanted surface 80d and an upper vertical surface 80e. Disposed between upper slanted surface 80d and middle vertical surface 80c is a middle shelf 80f. Similarly, disposed between lower slanted surface 80b and lower vertical surface 80a is a lower shelf 80g. An upper horizontal surface 80h is provided for further stabilization. Upper horizontal surface 80h may also function as a shelf. Inside corner miter bracket 80 further includes an inside edge 80j including a pair of holes 80k, 80l. The purposes of shelves 80f, 80g and holes 80k, 80l will be hereinafter described. A plurality of holes 80m are disposed on upper vertical surface 80e and middle vertical surface 80c, enabling the bracket 80 to be secured to the panels 16, 17 with conventional screws 85, as depicted in FIG. 2.

It will be appreciated that any of brackets 80, 82 and 84 will conform in contour to the foam core 21 of a cornice panel produced by back mold 129. Specifically, the bracket lower vertical surface 80a, 82a, 84a will rest against the 21a surface of the foam core 21 formed by lower vertical surface 129a of back mold 129; lower slanted surface 80b, 82b, 84b will rest against the surface 21b of the foam core formed by lower slanted surface 129b of back mold 129; reduced middle vertical surface 80c, 82c, 84c will rest against the surface 21c of the foam core formed by reduced middle vertical surface 129c, and so on. It will also be appreciated that the exact configuration of the brackets 80, 82, 84 may be varied, so long as the bracket conforms to the contour of the back of the cornice panel.

Figure 20:
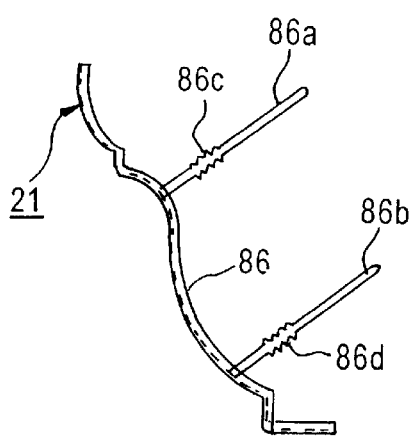
FIG. 20 is a side view of a corner welt form for the cornice of the present invention.

Referring to FIG. 20, a preferred embodiment of outer corner component 40 is depicted. Outer corner component 40 preferably is a one-piece molded welt 86 shaped to conform with the outer profile of the cornice 11, as depicted for instance in FIGS. 31 and 32. Welt 86 is preferably made of polyethylene, polypropylene, or nylon. Welt 86 includes two projecting pins 86a, 86b adapted to be positioned between the panels 16, 17, 18 and received in holes 80*k*, 82*k*, 84*k* and 80*l*, 82*l*, 84*l*. To assist in securing projecting pins 86*a*, 86*b* within the holes, a series of jagged edges 86*c*, 86*d* are provided on the surface of projecting pins 86*a*, 86*b*, respectively. As an alternative to the one-piece welt 86 of FIG. 20, a pair of pins may be utilized, each pin including the jagged edge described above.

Where necessary, front panel 16 may also be made of modular components in a similar manner as described above. Specifically, two front panels components may be connected to one another utilizing a flat splice plate conforming to the inside surface of the front panel components and secured to each front panel components by screws. This permits the cornice of the present invention to be adapted for use with long window coverings while being manufactured in lengths not exceeding, for instance, eight feet.

The modular feature of the invention is particularly advantageous for a number of reasons. First, it is more economical to manufacture and transport panels of a uniform length. Second, corner joiner assembly 19 permits easy assembly of the cornice at the installation site simply by making a 45° cut in the front and side panels, securing inner joiner component 39 to panels 16 and 17, 18 with conventional screws 85, and inserting welt 86 so that projecting pins 86*a*, 86*b* are positioned between the panels 16 and 17, 18 and received and secured in holes 80*k*, 82*k*, 84*k* and 80*l*, 82*l*, 84*l*. Third, the modular cornice is economical to manufacture, thus making the system available to an average homeowner.

Referring to FIGS. 3–9, the method of manufacturing the front and side panels 16, 17, particularly, the method of adhering the decorative fabric or wallpaper material 20 to the foam core 21, will be described in detail. This method is described in copending U.S. patent application Ser. No. 08/241,359, filed May 11, 1994, entitled "Decorative Valance and Process for Making the Same," the contents of which are hereby incorporated by reference. As described in the aforementioned application, the method requires the use of a vacuum ported, extruded aluminum mold 42 of a particular desired profile. For instance, mold 42 may be the colonial style mold front 42*a* of FIG. 31 or the southwestern style mold front 42*b* of FIG. 32. An accurate profile may be made by any conventional method. One of the more cost-effective methods is the extrusion of a single layer of aluminum. More elaborate profiles may include features such as channels disposed in the mold for circulating water to maintain the temperature of the mold at a desired temperature, and additional vacuum passageways. Prior to injection molding of the foam into the mold, the decorative fabric or wallpaper material is sequentially vacuum preformed into the mold 42, as indicated schematically in FIG. 3 and sequentially depicted in detail in FIG. 4. The decorative fabric or wallpaper material 20 is first laid or clamped against a top or bottom edge 43 of mold 42. Next, the material is laid onto the mold 42 in a sequential manner such that a first vacuum port 44 engages the material, followed by a second vacuum port 45, a third vacuum port 46, a fourth vacuum port 47, a fifth vacuum port 48, a sixth vacuum port 49, and a seventh vacuum port 50. The sequential vacuum preforming technique prevents the formation of kinks, bubbles, pattern deformation, and incomplete expansion of the material into the mold during the foam injection.

Figure 5:
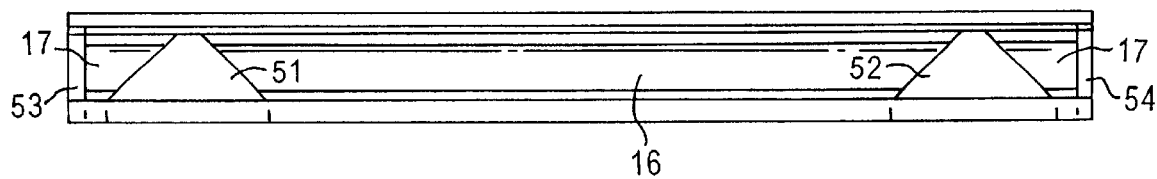
FIG. 5 depicts the preparation of the injection mold of the present invention.

Referring to FIG. 5, after the fabric 20 is sequentially vacuum preformed onto mold 42, internal mold corner-forming blocks 51, 52 and end-forming blocks 53, 54 are selectively positioned over the surface material. Corner forming blocks 51, 52 are required for the one-piece cornice disclosed in copending U.S. patent application Ser. No. 08/241,359, but are omitted when forming the preferred modular front and side panels 16, 17, 18 of the present invention. The blocks 51, 52, 53, 54 are typically molded from RTV silicone directly on the extruded aluminum profiles 42. These blocks 51, 52, 53, 54 are resilient and will seal well against the surface material, to assist the surface material in maintaining its profile and to prevent the injected foam from forming "flash" at the internal parting lines. The blocks 51, 52, 53, 54 also assist in clean release of the molded panels 16, 17 from mold 42 without the use of release agents.

As depicted in FIG. 6, a cover 55 having a plurality of holes 56 therein is placed on the mold profile 42, and foam in the liquid state is injected through the holes 52 to form foam core 21. A dispensing system, as typically used with packaging, is used to generate the foam. The foam may be urethane, polyurethane, polystyrene, or other foamable resin. A conventional dispensing system typically includes containers of resin components, which are pumped through a metering valve or shot timer and into a gun. During the foam injection process, the foam begins as a liquid, and while expanding, generates internal pressure ranging from about 2 to 1,000 lbs/in$^2$. Electrically heated delivery lines maintain the temperature of the components.

Polyurethane resins have good bonding characteristics and thus make excellent adhesives. Teflon and other olefinic resins, as well as RTV silicon, make good release agents, which may be required for even polished steel tools in order to effect a good release of the molded part. Two-part foamable polyurethane resin systems are available in densities of from less than one pound per cubic foot to over 15 lbs/cu.ft, and are widely used for packaging, insulation, floatation and structural applications. Additives are regularly used to enhance the fire retardant or resilient characteristics of the base material.

As the expanding foam is dispensed into the mold 42 and cover 55, it bonds aggressively to the fabric 20. Polyurethane foams are commonly designated by their free rise density. In order to generate sufficient pressure to effect mold filling, the cavity must be packed at approximately twice the designated density of the foam. Thus, a resin system designated as a "2 lb/cu.ft density" must be introduced to the mold cavity in a quantity sufficient to produce a part of 4 lbs/cu.ft density.

As an example, during a sample run, a mold having a combined fill volume of 0.125 cu.ft was used. A 10 ounce (0.625 lb) shot of liquid resin was injected, thus resulting in a good fill. The resulting part had a density of 5 lbs/cu.ft. During the test, proper resin and mold temperatures were monitored to arrive at a complete and efficient foaming of the polyurethane. A conventional resin temperature is about 120° F. and conventional mold temperatures are in the range of 100° F. to 140° F. Internal temperatures on large foam parts can reach 250° F., but dissipate quickly and thus skin temperatures are much lower. The foaming polyurethane forms a skin where it comes in contact with the mold, imparting a smooth surface to the finished part. Foaming was completed within about 3 minutes of mixing. Parts were removed from the mold within 10 minutes, and were fully cured in about 20 minutes. Once cured, the foamed resin is extremely stable, and absorbs less than 2% of its weight in water when submerged for a period of 5 years.

As shown in FIGS. 7 and 8, surface material overhangs 57, 58 are protected from the expanding resin by the mold inserts 51, 52. After removal of the inserts 51, 52, fabric tabs 59, 60 are cut in the overhangs 57, 58. The corner fabric tab 60 is cut to compensate for the profile of the decorative valance. The fabric tabs 59, 60 are then adhered to the foam core 21 through use of an adhesive and/or a device such as a small tacking iron. Alternatively, the overhangs 57, 58 may be cut off after removal of the inserts 51, 52.

Turning to FIG. 9, the final step in the formation of the one-piece cornice disclosed in copending U.S. patent application Ser. No. 08/241,359 is to adhere the side panels 17 to the front panel 16 through the use of an adhesive such as a hot melt adhesive. Hot melt adhesives comprise a broad range of Ethyl Vinyl Acetate (EVA) compounds, many with softening temperatures in the 180° F. range. Available in rods of from 5/16 inch to 2 inches in diameter, hot melt glue provides excellent fastening characteristics for the side panels to the front panel due to its tenacity and thixotropic characteristics. Hot melt can be handled neatly, is convenient and fast. Of added benefit to the proposed assembly process are hot melt's somewhat paradoxical forgiving open time coupled with a short set-up time.

It is readily understood that the above-described injection molding process is applicable both to the one-piece valance described above, as well as a modular cornice as depicted in FIGS. 1 and 2. As stated earlier, with a modular cornice, corner-forming blocks 51, 52 are not required, but rather two sets of end-forming blocks 53, 54 will be used on each component 16 and 17.

It is preferred that fabric 20 is made into a laminate prior to the step of vacuum forming onto the mold. Such a laminate preferably includes the fabric 20 laminated onto an impermeable barrier layer made of a thermoplastic material such as polyurethane or vinyl. The barrier layer may be laminated to fabric 20 either by hot rollers with or without adhesive, or cold rollers with some form of adhesive. The adhesive may be any conventional adhesive such as spray from a spray gun, sticky tape, or transfer coating. Alternatively, the barrier layer may be formed of a material having a plurality of layers wherein a first surface has a lower melt index than a material on the second surface, the first surface being adapted to adhere to the fabric and the second surface adapted to adhere to the injected foam. The first surface may be formed of polyurethane, vinyl or similar material, and the second surface may be formed from nylon, polyester, polypropylene, polystyrene, polysulfone, polyphenyl oxide (PPO), ABS, polycarbonate, polyvinyl chloride (PVC), or similar material. The films used for the impermeable barrier layer are available in a range of gauges from one mil and up. In a preferred embodiment, polyurethane is used for the first surface and nylon is used for the second surface. Having materials of varying melt index on opposite surfaces of the barrier layer compensates for the differentiation of bonding characteristics between the thermoplastic and the fabric or injected foam.

Alternatively, the above-described method of forming the cornice, as described in copending U.S. patent application Ser. No 08/241,359, may be modified as follows. In order to meet the UL requirements for installing the lighting system to the cornice according tot he present invention, it is necessary to provide a metal backing to the cornice. Because a metal backing provides additional stability, the use of a rigid foam is not as critical. Hence, according to the modification of the cornice according to the present invention, a softer, light-density foam may be used, such as an elastomeric foam, cellulosic foam or polyolefin. One advantage of using a light-density foam is that if the cornice is dropped or otherwise contacts another surface, the cornice of a light-density foam will spring back, thereby avoiding the dents common to the rigid foam. Because light-density foam is more inexpensive than the rigid foam, the increased materials costs associated with the provision of a metal backing are offset by the savings in utilizing a light-density foam.

To manufacture the cornice using a metal backing and a light-density foam, a metal plate is preformed to the desired contour of the cornice backing. The metal plate is pressed against the mold back 129, depicted in Figure 33. After the decorative fabric or wallpaper material 20 is laid against the mold 42, the mold front 42 and back 129 are placed together, and the light-density foam is injected into the mold, as described above with reference to FIG. 6.

Figure 10:
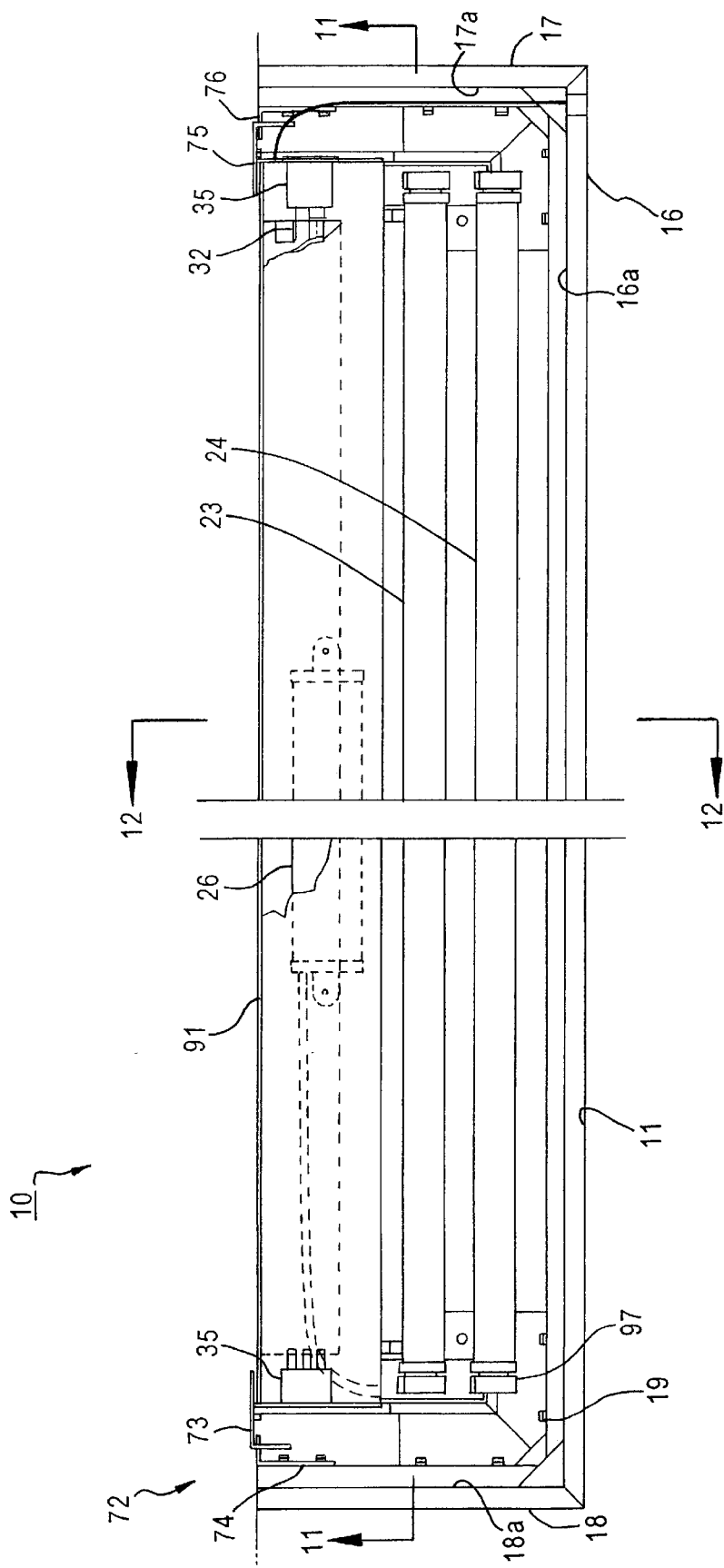
FIG. 10 is a plan view of the system of FIGS. 1 and 2.
Figure 14:
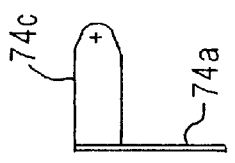
FIG. 14 is a side view of the wall mounting bracket of FIG. 13.
Figure 16:
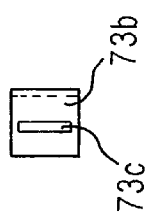
FIG. 16 is a front view of the cornice mounting bracket of FIG. 15.
Figure 13:
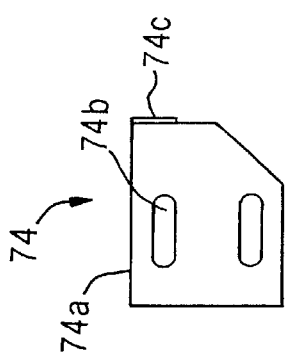
FIG. 13 is a front view of a wall mounting bracket of the present invention.
Figure 15:
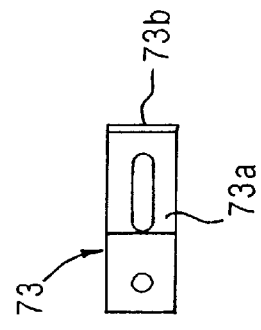
FIG. 15 is a side view of a cornice mounting bracket of the present invention.

Referring to FIGS. 10–12, depicting in detail the assembly of system 10, cornice 11 is mounted to a wall with a wall mounting assembly 72 including left and right hand cornice wall brackets 73, 75 attached to the wall and left and right hand cornice mounting brackets 74, 76 attached to the cornice. The details of brackets 73 and 74 are depicted in FIGS. 13 through 16. As seen in FIGS. 15 and 16, cornice wall bracket 73 is generally "L"-shaped and includes a first flat plate 73a having a plurality of slotted holes 73b adapted to receive a plurality of screws for mounting to the wall and a second plate 73c extending at a right angle relative to first flat plate 73a. Cornice mounting bracket 74, depicted in FIGS. 13 and 14, is likewise "L"-shaped and includes a first leg 74a adapted to be secured to inside surface 18a of side panel 18. A second leg 74b of cornice mounting bracket includes a slotted hole 74c adapted to receive second plate 73c of cornice wall bracket 73 therein. A similar but opposite right hand cornice wall bracket 75 and right hand cornice mounting plate 76 are used to mount the right panel 17 to the wall, as depicted in FIGS. 10 and 11.

C. Lighting System Support Structure

Although there are a number of options for mounting the components of the lighting system 12 and the power system 15 either within the cornice or directly to the wall, a preferred embodiment of the structure for mounting the lighting system directly to the wall is depicted in FIGS. 21 and 21(a) through 21(h). The lighting system support bracket assembly 25 includes several fixture mounting brackets 90 secured directly to the wall via screws 90a (see FIGS. 1 and 12). Brackets 90 preferably include a lower perpendicular leg 90b and a lip 90c. A support fixture 91 (shown in detail in FIG. 21(c)), preferably an extrusion running the length of the cornice 11, sits on lower leg 90b of brackets 90 and clips onto brackets 90 by positioning an upstanding leg 91m (FIG. 21(c)) in lip 90c.

Figure 21:
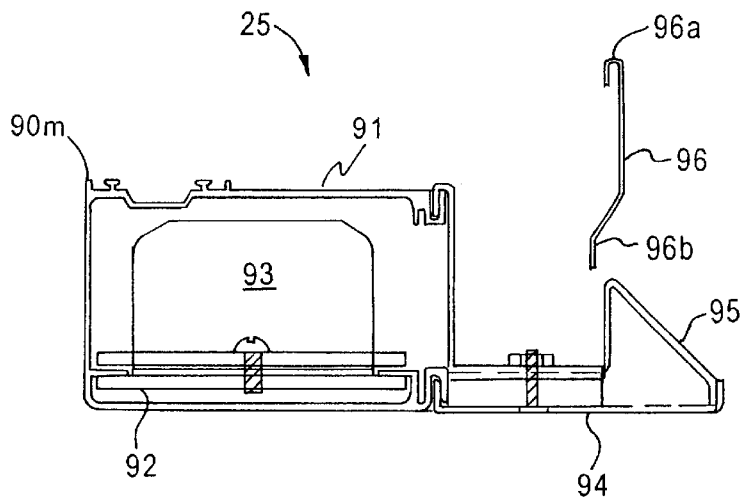
FIG. 21 is an assembly view of the lighting fixture of the present invention.
Figure 21C:
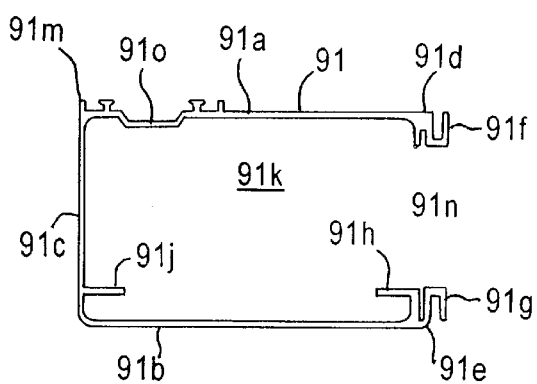
FIGS. 21(a) through 21(e) are detail views of the components of the lighting fixture of FIG. 21.
Figure 21A:
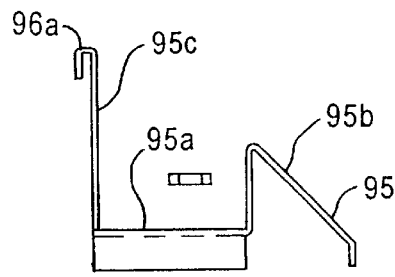
Figure 21B:
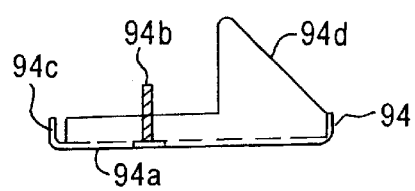
Figure 21D:
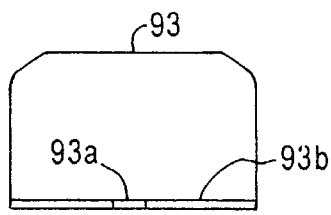
Figure 21E:
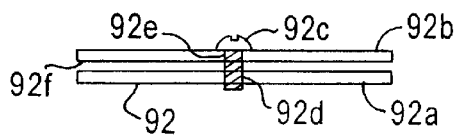
Figures 21F, 21G:
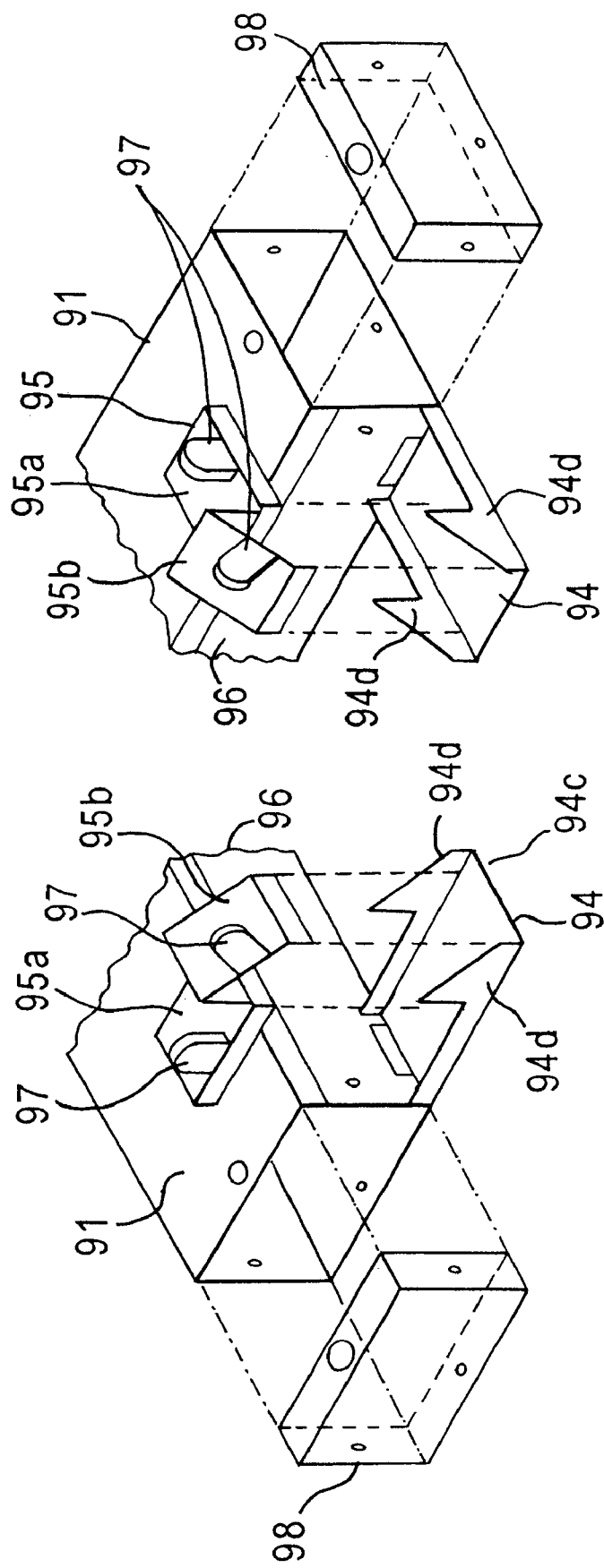
FIGS. 21(f) and 21(g) are partially exploded perspective views of the lighting fixture of FIG. 21.
Figure 21H:
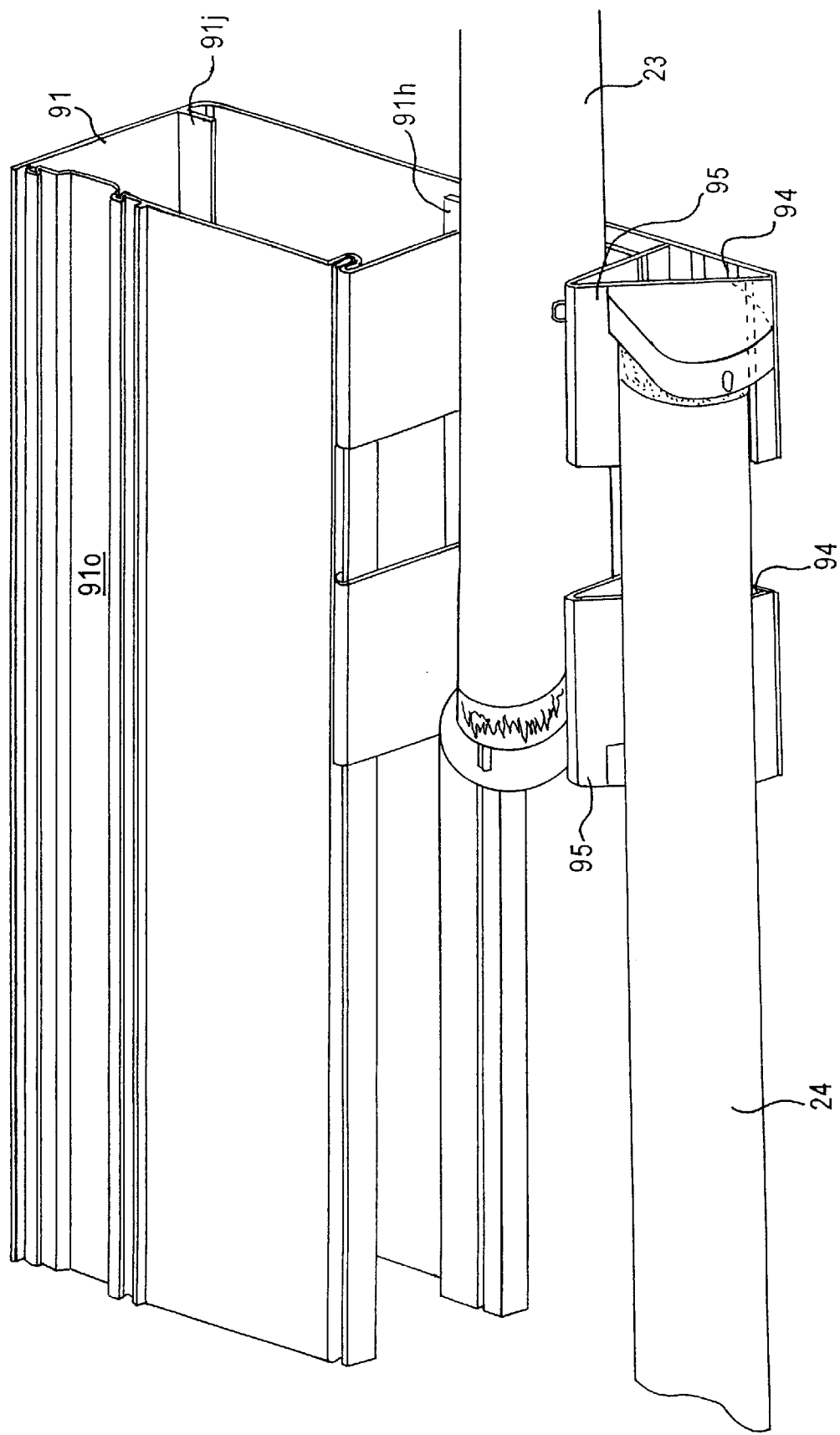
FIG. 21(h) is a perspective view of an optional configuration of the components of the lighting fixture of FIG. 21.

Support fixture 91 supports a ballast clamp 92 (see FIG. 21(e)) and ballast 93 (see FIG. 21(d)). Specifically, support fixture 91 is rectangular and includes an upper wall 91a, a lower wall 91b and a side wall 91c. Upper wall 91a advantageously includes a recess 91o adapted to receive the hexagonal head of a bolt to permit installation of the fixture 91 to the ceiling, if desired.

Between upper and lower walls 91a, 91b and opposing side wall 91c is an opening 91n. Opening 91n provides access to a space 91k created between the upper, lower, and side walls 91a, 91b, 91c, thus permitting the installation of other components of the window treatment/lighting system 10 as desired. For instance, a motor for actuating the window treatment or logic control unit 29 may advantageously be installed inside fixture 91. Opening 91n further permits ready access to the ballast, installed in the fixture 91 as described below.

Protruding from an end 91e of lower wall 91b is an inwardly disposed flange 91h, and a similar flange 91j is inwardly disposed from side wall 91c. These flanges 91h, 91j support ballast clamp 92 as described below.

Ballast clamp 92, depicted in FIG. 21(*e*), includes two plates 92*a*, 92*b* secured to one another in spaced relation with a screw 92*c* received in holes 92*d*, 92*e* of plates 92*a*, 92*b*, respectively. Ballast clamp 92 is inserted into fixture 91 with flanges 91*h*, 91*j* received in the space 92*f* between plates 92*a*, 92*b*. Ballast 93, depicted in FIG. 21(*d*), includes a hole 93*a* in a lower flange 93*b*. Lower flange 93*b* is received within space 92*f* of ballast clamp 92 with hole 93*a* lined up with holes 92*d*, 92*e* so that screw 92*c* of ballast clamp 92 may be threaded into to be mounted thereto. When inserted into fixture 91, ballast 93 is received within the space 91*k* created between the upper, lower, and side walls 91*a*, 91*b*, 91*c*.

A socket base 94 (see FIG. 21(*b*)) is mounted to fixture 91. Fixture 91 includes ends 91*d*, 91*e* of upper and lower walls 91*a*, 91*b*, respectively, which oppose side wall 91*c* and terminate in lips 91*f*, 91*g*. Socket base 94, depicted in FIG. 21(*b*), includes a lower plate 94*a* from which at least one stud 94*b* projects. Lower plate 94*a* terminates in an upstanding leg 94*c* adapted to be received in lip 91*g* of fixture 91. Socket base 94 further includes a side plate 94*d* at both ends thereof. A socket cap 95 is secured to socket base 94. As seen in FIG. 21(*a*), socket cap 95 includes a base plate 95*a* including a hole (not shown) through which stud 94*b* is received. Socket cap 95 further includes an angular plate 95*b* and an upstanding leg 95*c* including a hook 95*d* adapted to be received in lip 91*d* of fixture 91. A standard fluorescent light socket 97, depicted in FIGS. 21(*f*) and 21(*g*), is mounted to base plate 95*a* and angular plate 95*b*.

Lighting system support bracket assembly 25 further includes a cover 96, and an end cap 98. As depicted in FIG. 21, cover 96 includes a hook 96*a* adapted to be received in that portion of lip 91*d* that is disposed between the socket covers 95 at either end of fixture 91. Cover 96 also includes a lower indented portion 96*b* adapted to be positioned on the inside portion of lip 91*g*. Referring to FIGS. 21(*f*) and 21(*g*), an end cap 98 is received on the ends of fixture 91 to seal the fixture.

As best seen in FIGS. 1 and 2, the cornice 11 of the present invention provides a plurality of shelves 87, 88, 89. These shelves may provide support for various structures as required. For instance, as seen in FIG. 1, the middle shelf 88 preferably supports socket base 94. Additionally, one or more of shelves 87, 88, 89 may support a light diffuser 120 (FIG. 11) made of a planar lexan plastic prism-type material typically used on fluorescent lights. Another option for utilizing upper shelf 87 is in providing a dust cover, or a support shelf for, for example, knick-knacks, trophies, and the like.

Referring to FIG. 21(*h*), an optional configuration of the components of the lighting system support bracket assembly 25. This configuration is especially suited for systems wherein the cornice requires more than one length of fluorescent lights 23, 24. For instance, fluorescent lights typically are sold in standard lengths of 2', 4', 6' or 8'. If a system 10 includes a cornice of a length differing from the standard lengths of fluorescent lights, it will be necessary to install more than one length of fluorescent lights. Oftentimes, fluorescent lights are installed with end-to-end, with the sockets abutting each other. This configuration disadvantageously results in socket shadow, i.e., a gap in the lighting caused by the sockets blocking the light emanating from the fluorescent light. The components of the lighting system support bracket assembly 25 of the present invention are easily configured to avoid this problem.

Specifically, referring to FIG. 21(*h*), two socket base 94/socket cap 95 assemblies are provided, positioned generally next to one another. These assemblies easily slide along the length of fixture 91 at lip 91*f*. Preferably, the fluorescent lights 23, 24 are positioned on socket base/socket cap 94, 95 such that the lights 23, 24 are offset from and overlap each other, thus providing a continuous output, with no obstruction resulting from the sockets 97.

D. Motorization of Window Treatment

The system for motorization of the window treatment will vary depending on the window treatment used. There are a number of systems disclosed in the prior art for the automatic actuation of window treatments, including shades, venetian blinds, pleated blinds, roman shades, vertical blinds, drapery, etc. One example of a system for the motorization of a roller shade is depicted in FIG. 11. A reversible dc motor 124, controlled by a system control module 122, drives a shaft 126 which, in turn, rotates cone lift system 128, to which the roller shade (not shown) is attached. Motor 124 rotates shaft 126 either clockwise or counter-clockwise, responsive to system control module 122, the cone lift system 128 lifts or lowers the roller shade.

For a window treatment suspending from a rotating shaft, wherein rotation of the shaft causes the window treatment to be raised and lowered, the weight of the window treatment exerts a torque on the shaft. This torque must be resisted in order to maintain the window treatment at the desired position. Typically, the torque is resisted by a clutch or locking mechanism. A unique clutch, according to the present invention, is depicted in FIGS. 39–41.

Referring to FIGS. 39–41, a clutch 170 includes a motor 171 operatively connected to a shaft 172, with a manual pulley 173 at an opposite end of shaft 172. Motor 171 permits motorized actuation of the window treatment, while pulley 173, actuated by pulling a cord, not shown, attached to pulley 173, permits manual override of the motorized actuation.

Attached to the motor end 172*a* of shaft 172 is a motor actuator 174. A similar pulley actuator 175 is attached to the pulley end 172*b* of shaft 172. Shaft 172, motor actuator 174, and pulley actuator 175 are all rigidly secured to one another such that the shaft 172 and actuators 174, 175 rotate and translate as a unit.

Motor actuator 174 includes a cavity 174*a* divided into three portions, identified from left to right as 174*b*, 174*c*, and 174*d*. Center portion 174*c* is internally threaded, and is enveloped by unthreaded portions 174*b* and 174*d* on either side thereof. Similarly, pulley actuator 175 includes a cavity 175*a* divided into three portions, identified from left to right as 175*b*, 175*c*, and 175*d*. Unlike motor actuator 174, center portion 175*c* of pulley actuator is unthreaded and is enveloped by internally threaded portions 175*b* and 175*d* on either side thereof. Preferably, portions 174*b*, 174*c* and 174*d* are approximately equal in width to one another, and portions 175*b*, 175*c* and 175*d* are also approximately equal in width to one another.

Motor 171 drives a drive shaft 176 driving, in turn, a gear 177. Gear 177 may be, for instance, an externally threaded spur or helical, as desired. Gear 177 is disposed within cavity 174*a* of motor actuator 174 and is of a width approximately equal to or preferably slightly less than the width of portions 174*b*, 174*c*, 174*d*. When positioned in center portion 174*c* of motor actuator 174, the external threads of gear 177 mesh with the internal threads of portion 174*c* such that rotation by motor 171 of drive shaft 176 and gear 177 causes rotation of motor actuator 174, in turn rotating shaft 172. This position is depicted in FIG. 40. When gear 177 is positioned in either portion 174*b* (FIG. 39) or 174*d* (FIG. 41), there is no operational connection between motor 171 and motor actuator 174. A pair of compression springs 178, 179 are disposed at either side of gear 177 and abut against spring abutment surfaces 174e, 174f of motor actuator 174. Springs 178, 179 bias gear 177 into engagement with central portion 174c.

Pulley 172 is rigidly attached to a gear 180 via a drive screw 181. Gear 180 may be, for instance, an externally threaded spur or helical, as desired. Gear 180 is disposed within cavity 175a of pulley actuator 175 and is of a width approximately equal to or preferably slightly less than the width of portions 175b, 175c, 175d. When positioned in either right portion 175b or left portion 175d of pulley actuator 175, the external threads of gear 180 mesh with the internal threads of portion 175b, 175d such that rotation of pulley 173, and hence gear 180, causes rotation of pulley actuator 175, in turn rotating shaft 172. These position are depicted in FIGS. 39 and 41. When gear 180 is positioned in center portion 175c (FIG. 40), there is no operational connection between pulley 172 and pulley actuator 175.

Pulley actuator 175 includes a right flange 175e including an internally threaded opening 175f. At least a central portion 181a of drive screw 181 is externally threaded to mate with internally threaded opening 175f. Rotation of drive shaft 181 via pulley 173 causes pulley actuator 175 to "walk" along drive shaft 181, thus moving shaft 172 and actuators 174, 175 between the positions depicted in FIGS. 39, 40 and 41.

More specifically, FIG. 40 depicts the preferred position of drive shaft 172 and actuators 174, 175. In FIG. 40, the motor actuator 174 is in operative engagement with gear 177 driven by motor 171. In its resting state, motor 171 provides sufficient resistance to the torque resulting from the weight of the window treatment to maintain the position of the window treatment. Upon operation of motor 171, the motor drive shaft 176 and gear 177 rotate in either the clockwise or counterclockwise direction, causing the motor actuator 174 and shaft 172 to rotate to lift or lower the window treatment.

When manual operation is desired, pulley 173 is rotated in either the clockwise direction, as depicted in FIG. 39, or the counterclockwise direction, as depicted in FIG. 41. Referring to FIG. 39, rotation of pulley 173 in the clockwise direction in turn rotates drive shaft 181 in the clockwise direction, causing pulley actuator to "walk" toward the right, in the direction indicated by the horizontal arrow of FIG. 39. This places gear 180 in operative engagement with the left portion 175b of cavity 175a. Likewise, gear 177 is moved to left portion 174b of motor actuator 174, thus freeing gear 177 from operative engagement with motor actuator 174. Further rotation of pulley 173 rotates gear 180 and thus pulley actuator 175, thereby rotating shaft 172 to lift or lower the window treatment.

Referring to FIG. 41, rotation of pulley 173 in the counter-clockwise direction, as indicated by the vertical arrow of FIG. 41, causes pulley actuator 175 to "walk" toward the left, in the direction indicated by the horizontal arrow. Gear 180 is positioned in the right portion 175d in operative engagement with pulley actuator 175. Also as a result of the movement of pulley actuator 175 to the left, motor actuator 174 also moves to the left, such that gear 177 is positioned in the left cavity 174d of motor actuator 174, again freeing motor actuator 174 from engagement with gear 180. Further rotation of pulley 173 rotates gear 180, pulley actuator 175, and shaft 172 to left or lower the window treatment. Upon release of the pulley 173, the springs 178 and 179 position gear 177 within center portion 174c of motor actuator 174, and motor 171 then provides sufficient resistance to the torque resulting from weight of the window treatment to maintain the window treatment in the desired position. It will be appreciated by one of ordinary skill in the art that the actuators 174, 175 may dimensioned such that actuator 174 is required to "walk" along drive shaft 181 a distance of only approximately ¼ inch before transitioning the clutch 170 between manual and motorized actuation, as desired.

Another unique and novel feature of the present invention is a system for the motorization of a horizontally traversing window treatment, such as a traversing drapery or a vertical blind. Referring to FIGS. 22 through 26, a system 100 for the motorization of a traversing drapery is depicted. While this system is depicted with use of a drapery suspended from, for example, drapery hangers 114, it will be appreciated by those skilled int he art that the system described below is easily adaptable to vertical blinds and any other horizontally traversing window treatment.

System 100 includes a reversible drive motor 102 driving a drive shaft 103 including a threaded portion 103a. A support bracket 105 includes a hole 105a in a bottom flange 105b thereof through which threaded portion 103a of drive shaft 103 is received. Bottom flange 105b may be of a thickness equal to one thread of threaded portion 103a; alternatively, if bottom flange 105b is of a thickness greater than one thread, hole 105a may be threaded. Upon rotation by drive motor 102, drive shaft 103 will rotate within hole 105a, causing drive motor 102 and drive shaft 103 to travel upwardly or downwardly, depending on the direction of rotation.

Figure 24:
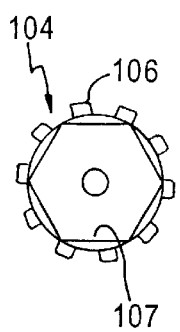
FIG. 24 is a plan view of the drive gear of the assembly of FIGS. 22–23.

Drive shaft 103 is attached to and drives an upper gear 116 and a lower gear 118. Gears 116, 118 may be, for instance, spur gears or helical gears. A drive gear 104 is disposed between upper gear 116 and lower gear 118. As best seen in FIG. 24, drive gear includes a hexagonal recess 107. Both gears 116, 118 are of a hexagonal shape. An upper spring 120 is located on drive shaft 103 between upper gear 116 and drive gear 104; similarly, a lower spring 122 is located on drive shaft 104 between drive gear 104 and lower gear 118.

During operation, as the motor 102 turns in the clockwise direction, it travels upwardly, pushing lower gear 118 in contact with drive gear 104 against the bias of lower spring 122 so that the hexagonal shape of lower gear 118 is received within hexagonal recess 107. This in turn rotates the drive gear in a clockwise direction. When the motor turns in the counter-clockwise direction, the motor moves downwardly, causing upper gear 116 to contact drive gear 104 against the bias of upper spring 120 so that the hexagonal shape of upper gear 116 is received within hexagonal recess 107 of drive gear 104. This will rotate the drive gear in a counter-clockwise direction. It will be apparent to one of ordinary skill in the art that by reversing the threading of threaded portion 103a of drive shaft 103, the directions of motion may be reversed without departing from the scope of the invention.

Springs 120, 122 permit the drapery to be opened or closed manually, i.e., without the use of motor 102. Springs 120, 122 force the gears 116, 118 to disengage hexagonal recess 107 of drive gear 104, permitting manual rotation of drive gear 104. Gears 116, 118 will not engage drive gear 104 until the motor is reactivated.

Figure 22:
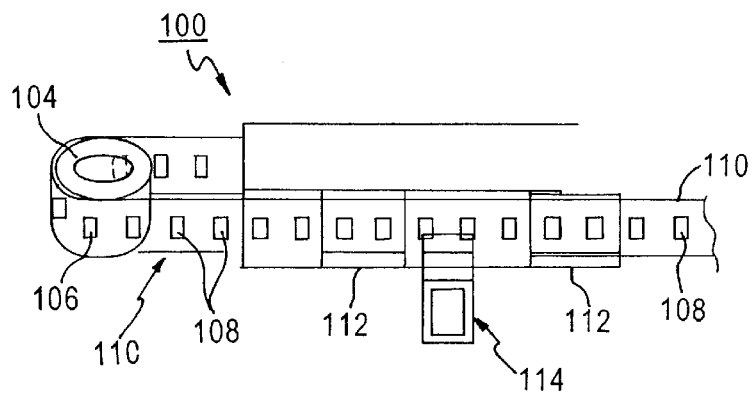
FIG. 22 is a schematic perspective view of a motorized traversing drapery assembly of the present invention.
Figure 23:
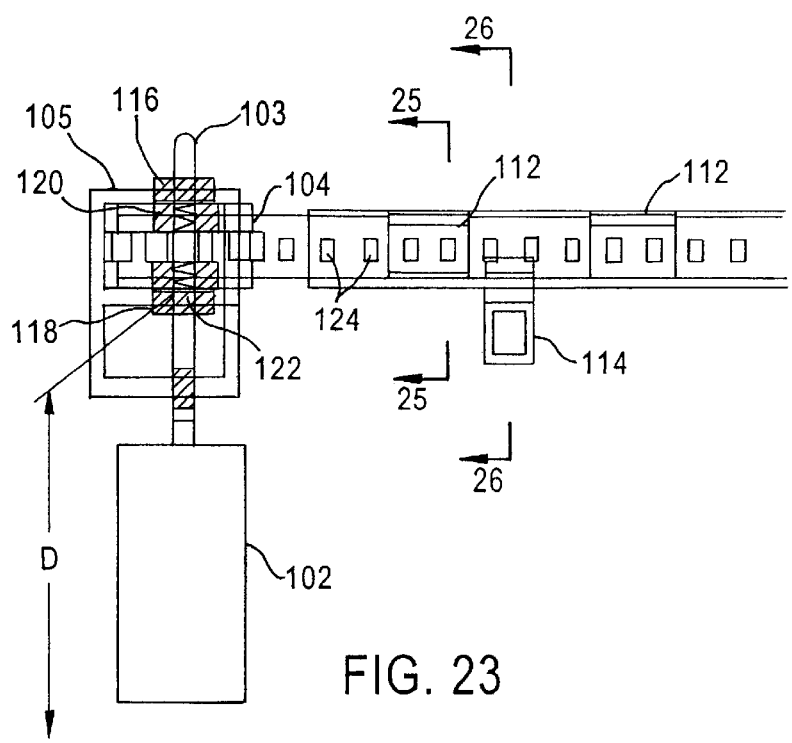
FIG. 23 is a front schematic view of the assembly of FIG. 22.

As depicted in FIGS. 22 and 24, drive motor 104 further includes teeth 106 cooperating with holes 108 on a tape 110. Clockwise or counterclockwise rotation of drive gear 104 results in back and forth motion of tape 110. Tape 110 guides a plurality of carrier rams 112 to push and pull the drapery hangers 114.

Figure 25:
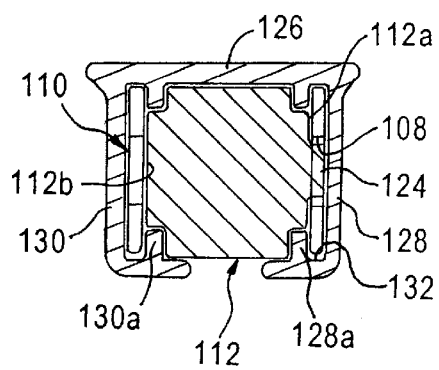
FIG. 25 is a cross-sectional view taken along lines 25—25 of FIG. 23.
Figure 26:
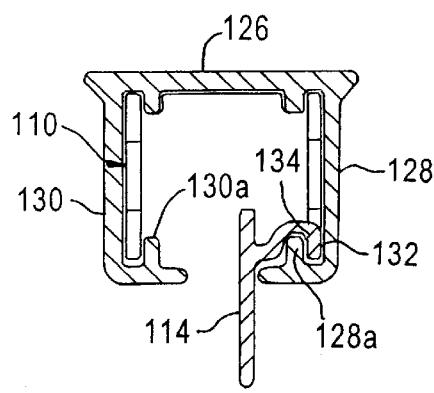
FIG. 26 is a cross-sectional view taken along lines 26—26 of FIG. 23.

Referring to FIG. 25, each carrier ram 112 includes one or more projections 124 on a front side 112a of carrier ram 112, engaging holes 108 of tape 110. The rear side 112b of carrier ram is flat. Thus, as tape 110 moves in either direction, the tape carries the carrier ram 112. Carrier ram is further supported by a drapery rod 127 including a pair of 1-shaped legs 128, 130 having upstanding legs 128a, 130b, respectively, forming a guide 132. Drapery hangers 114, from which the drapery is suspended, are positioned between carrier rams 112 and include a lip 134 also received in guide 132. Drapery hangers 114 freely slide along guide 132, as best seen in FIG. 26.

In operation, drive motor 102 responds to an appropriate signal by moving in a clockwise or counter-clockwise direction, driving drive shaft 103 and upper and lower gears 116, 118. As drive shaft 103 rotates, drive shaft 103 and thus drive motor 102 travels vertically to position one of upper or lower gear 116, 118 in hexagonal recess 107 of drive gear 104, causing drive gear 104 to drive tape 110. Movement of tape 110 drives carrier rams 112, which in turn cause drapery holders 114 to slide along guide 132 of drapery rod 126. The drapery suspended from drapery holders 114 thus traverse between an open and closed position.

It will be appreciated that the foregoing description is of a preferred embodiment, and that variations of the system 100 depicted in FIGS. 22–26 are possible. For instance, the hexagonal shape of upper and lower gears 116, 118 and the hexagonal recess 107 of drive gear 104 provide one means of selectively operationally engaging the gears 116, 118 with drive gear 104. Alternatively, the system described with reference to FIGS. 39–41 may be adapted for use with the horizontally traversing drapery or vertical blind of FIGS. 22–26. The numerous other alternatives are considered to be within the scope of the present invention.

E. Power Cord

Figure 27:
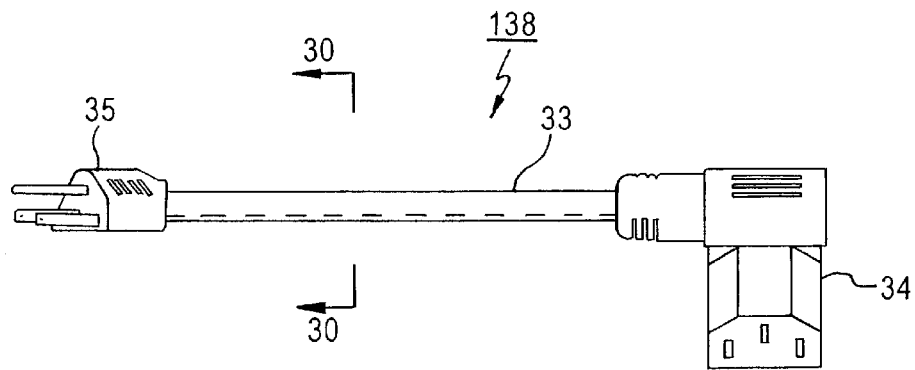
FIGS. 27—29 depict various embodiments of the power cord of the present invention.
Figure 28:
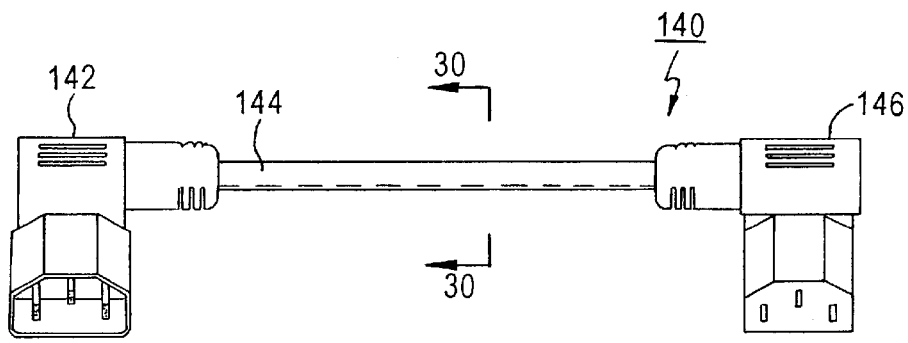
Figure 29:
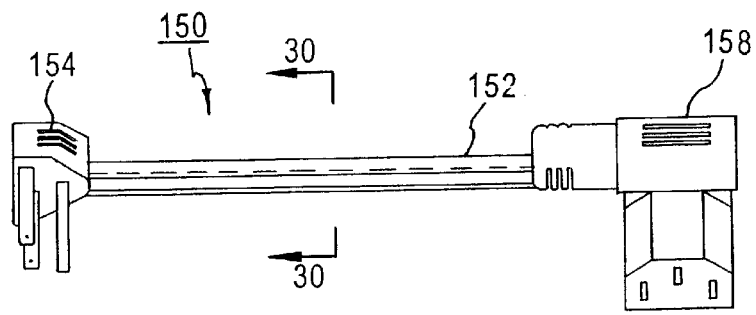

FIGS. 27–30 depict various embodiments of a unique power cord of the present invention. FIG. 27 depicts the power cord of FIG. 1, designated by reference numeral 138, comprising cord 33 terminating at female receptacle 34 at one end and conventional male receptacle 35 adapted to be received in a standard wall outlet. The unique power cord of FIG. 28 is an extension power cord 140 adapted to provide power from one cornice to another and includes a male receptacle 142, cord 144 and a female receptacle 146. The unique power cord 148 of FIG. 29 is similar to power cord 138 of FIG. 27, with a female receptacle 150, cord 152 and a 90° male receptacle 154.

Figure 30:
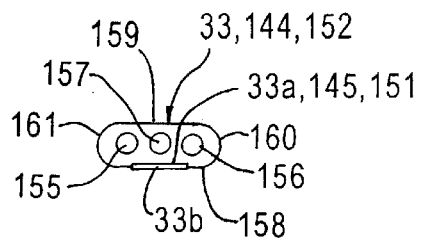
FIG. 30 is a cross-sectional view taken along line 30—30 of FIGS. 27–29.

Referring to FIG. 30, a cross-sectional view of cords 33, 144, 152, recess 33a, 145, 151 is clearly depicted. Power cord 33, 144, 152 includes a conventional hot wire 155, neutral wire 156 and ground wire 157. As seen in FIG. 30, power cord 33, 144, 152 is of a generally flat rectangular cross section and includes two opposing flat faces 158, 159 joined by two opposing curved ends 160, 161. According to a unique feature of the invention, and as stated earlier, recess 33a, 145, 151 in cord 33, 144, 1152, respectively, is provided in flat face 158 and is adapted to receive one side of double sided foam tape 33b therein. The other side of double sided foam tape 33b may be secured to a wall or window molding. Preferably, the depth of recess 33a, 145, 151 is slightly less than the thickness of double sided foam tape 33b to permit good adhesion of double sided foam tape 33b to both the recess and the wall and maintain the upper flat face 158 of cord 33, 144, 152 in a position as close to the wall as possible. Thus, power cord 33, 144, 152 is held in place against the wall or window molding, and is preferably hidden from view by the window covering.

The unique power cord of the present invention has many advantages. For instance, the power cord is plugged into a conventional wall outlet, thereby eliminating the requirement of a licensed electrician for installation of the system 10 of the present invention. This feature also makes the system 10 of the present invention more suitable for sale at a discount hardware store attracting "do it yourself" homeowners. The provision of a recess for the double-sided foam tape permits the power cord to be easily placed and secured where aesthetically desired.

F. System Control

Preferably, the window covering/lighting system 10 of the present invention includes a plurality of cornices 11, each cornice having lighting system 12, window treatment 13, and power system 15. Each cornice includes infrared sensor 31. The remote control unit 14, depicted in FIGS. 36, 37 and 38, emits two infrared signals. The first signal is a focused signal that will only be sensed by one infrared sensor 31 located on one cornice 11. The second signal is a wide area infrared signal which is received by all the infrared sensors mounted on the plurality of cornices 11. The remote control unit 14 is thus capable of actuating the logic control unit 29 of all cornices 11 together, as a unit, responsive, for instance, to a sensed occupancy condition in the room, or actuating the logic control unit 29 of one cornice 11 responsive to a manual override condition.

Figures 36, 37, 38:
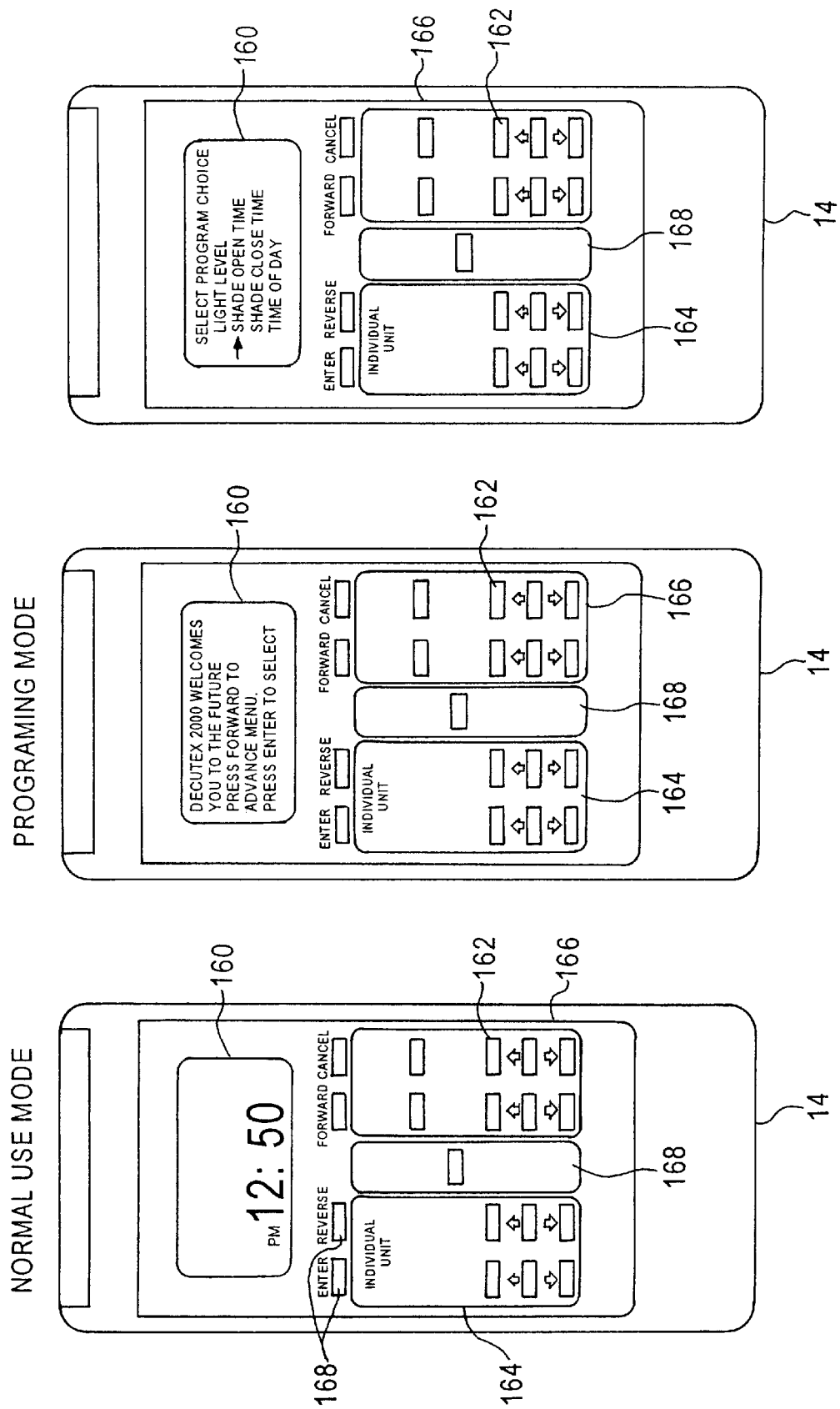
FIGS. 36–38 depict the remote control unit of the present invention.

The remote control unit 14 is shown in FIG. 36 in a normal use mode, wherein the time of day is displayed on a display 160. A plurality of buttons 162 are provided. One set 164 of buttons 162 are operable to actuate the logic control unit 29 of an individual unit. A second set 166 of buttons 162 are operable to operate the plurality of cornices 11. A third set 168 of buttons 162 activate the programming mode of the remote control unit, as depicted in FIGS. 37 and 38. In FIGS. 37 and 38, the display 160 displays instructions to the user, providing a user friendly programming system for the logic control units 29. It is understood that the remote control unit 14 may be more advanced or more simple than that depicted in FIGS. 36–38. For instance, the remote control unit 14 may permit only manual override of the programmed logic control units 29, with the logic control units 29 programmed at installation. It is to be understood that such modifications of the remote control unit 14 are considered to be within the scope of the present invention.

Figure 35:
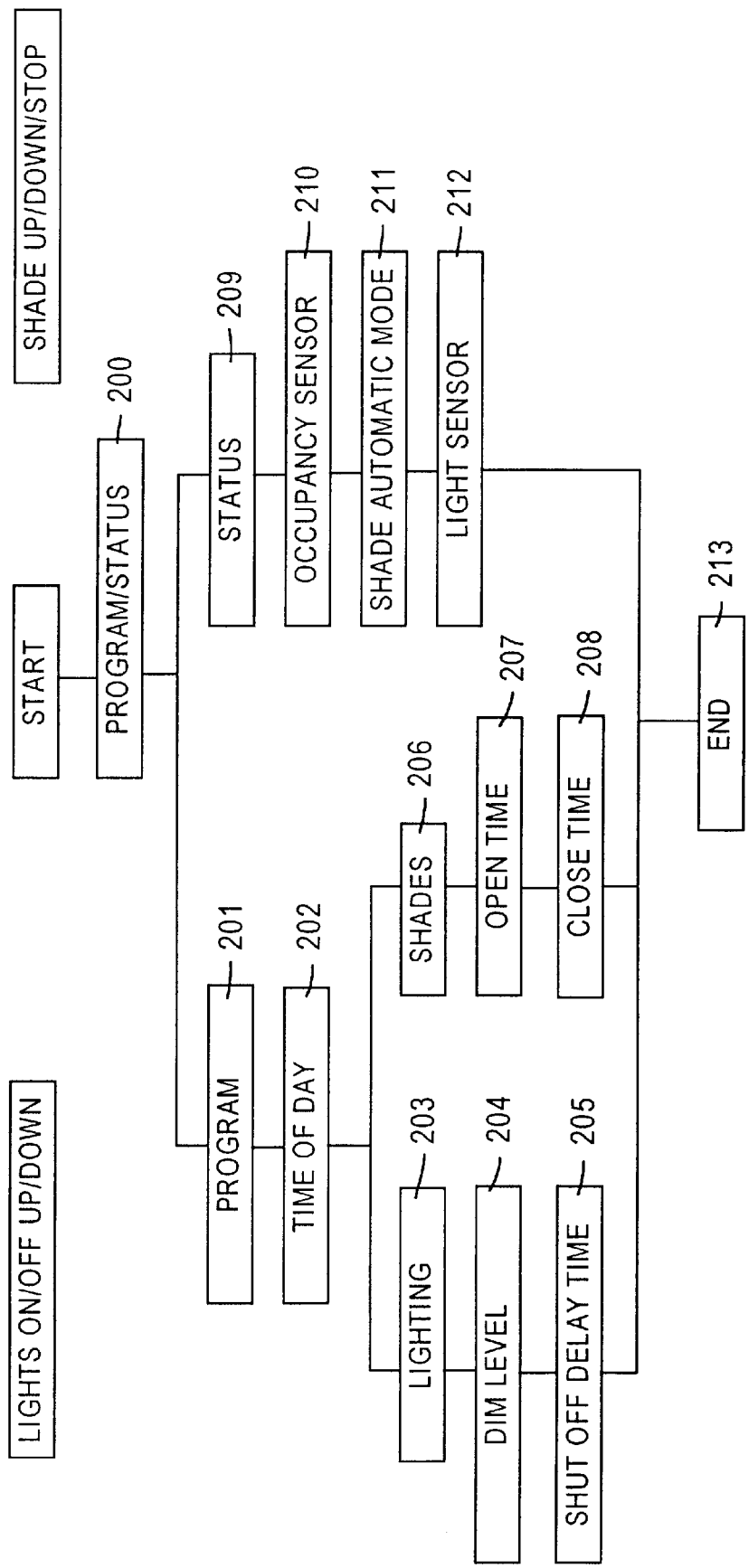
FIG. 35 is a sample flow chart for the logic control unit of the present invention.

FIG. 35 is a sample flow chart for the logic control unit 29. Initially, at step 200, it is determined whether the program mode or the status mode is desired. If program mode is desired, processing continues to step 201 to initialize the programming routine. At step 202, the time of day is input. Processing then continues to step 203, initializing the lighting routine. A dim level is input at step 204, and a shut off delay time is input at step 205. The processing then ends at step 213.

If after the time of day is input, it is desired to program the control of the shades, processing progresses from step 202 to step 206, initializing the shade routine. An open time is input at step 207, a close time is input at step 208, and the processing ends at step 213.

If it is determined at step 200 that the status mode is desired, the status routine is initialized at step 209. The occupancy is sensed at step 210, and the shade automatic mode is automated responsive to the sensed occupancy condition at step 211, and the light sensor is actuated responsive to the sensed occupancy condition at step 212. The routine ends at step 213.

It will become apparent to one of ordinary skill in the art that the flow chart described above may be modified to provide additional or equivalent functions of the logic control unit 29. Such modifications are intended to be within the scope of the present invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. Window covering and lighting system for a window in a room comprising:
    a cornice mounted to a wall supporting a window covering movable between an open position and a closed position,
    an actuator operatively associated with the cornice for moving the window covering between the open position and the closed position,
    a lighting system operatively associated with the cornice; and
    a programmable logic control unit for operating the actuator and the lighting system independently from one another upon demand.

2. The system of claim 1, wherein the lighting system comprises a dimmable ballast operatively attached to at least one fluorescent lamp.

3. The system of claim 2, wherein the logic control unit actuates the ballast responsive to ambient light conditions in the room.

4. The system of claim 1, further comprising a remote control unit providing a signal to the logic control unit, the logic control unit operating at least one of the actuator and light system responsive to the signal.

5. The system of claim 1, wherein the signal is an infrared signal transmitted from the remote control unit and received by an infrared sensor mounted to the cornice.

6. The system of claim 4, wherein the remote control unit transmits a signal to program the logic control unit.

7. The system of claim 1, further comprising a light sensor for sensing ambient light conditions in the room, and a motion detector for detecting occupancy of the room, and wherein the programmable logic control unit is responsive to the sensed ambient light conditions and the detected occupancy.

8. The system of claim 1, further comprising a light sensor for sensing ambient light conditions in the room, and wherein the programmable logic control unit is responsive to the sensed ambient light conditions.

9. The system of claim 1, further comprising a motion detector for detecting occupancy of the room, and wherein the programmable logic control unit is responsive to the detected occupancy.

10. The system of claim 1, further comprising means for manually overriding the programmable logic control unit for operating at least one of the lighting system or the actuator.

11. The system of claim 10, wherein the overriding means comprises a signal transmitted from the remote control unit to the programmable logic control unit.

12. The system of claim 1, wherein the logic control unit actuates the window covering responsive to ambient light conditions in the room as detected by a sensor.

13. The system of claim 12, further comprising a sensor for sensing the ambient light conditions in the room.

14. The system of claim 1, wherein the logic control unit actuates the lighting system responsive to ambient light conditions in the room as detected by a sensor.

15. The system of claim 14, further comprising a sensor for sensing the ambient light conditions in the room.

16. The system of claim 1, wherein the logic control unit actuates the lighting system responsive to occupancy of the room as detected by a sensor.

17. The system of claim 16, further comprising an occupancy sensor operatively connected to the logic control unit for providing a signal indicating occupancy to the logic control unit.

18. The system of claim 17, wherein the occupancy sensor is a motion detector.

19. The system of claim 17, wherein the occupancy sensor is a passive infrared detector.

20. The system of claim 1, further comprising a power cord operatively secured to at least one of the lighting system, the actuator and the logic control unit for supplying power to the system.

21. The system of claim 1, wherein the cornice is modular and includes a front panel, a pair of side panels, and a pair of corner joining assemblies joining the front panel with each of the side panels.

22. The system of claim 1, wherein the cornice includes a shelf on the back side thereof for supporting a diffuser.

23. The system of claim 1, wherein the cornice includes a plurality of shelves on the back side thereof for supporting at least one of a diffuser and a dust cover.

24. An improved window covering and lighting system for a window in a room comprising:
    a plurality of cornices, each cornice mounted to a wall in the room and including a window covering supported by the cornice and movable between an open position and a closed position, an actuator operatively associated with the cornice for moving the window covering between the open position and the closed position, a lighting system operatively associated with the cornice, and a programmable logic control unit for operating at least one of the actuator and the lighting system independently from one another upon demand; and
    a remote control unit providing a signal selectively to at least one of the logic control units of at least one of the plurality of cornices, the logic control units being responsive to the signal.

25. The system of claim 24, wherein the lighting system comprises a dimmable ballast operatively attached to at least one fluorescent lamp.

26. The system of claim 24, wherein the logic control unit actuates the ballast responsive to ambient light conditions in the room.

27. The system of claim 24, wherein the signal is an infrared signal transmitted from the remote control unit and received by an infrared sensor mounted to each of the plurality of cornices.

28. The system of claim 27, wherein the remote control unit provides a focused infrared signal received by only one of the infrared sensors mounted on the plurality of cornices to operate only one of the plurality of cornices.

29. The system of claim 27, wherein the remote control unit provides a wide area infrared signal received by all of the infrared sensors mounted on the plurality of cornices to activate the plurality of cornices simultaneously.

30. The system of claim 24, wherein the remote control unit transmits a signal to program the logic control unit.

31. The system of claim 24, wherein each of the plurality of cornices further comprises a light sensor for sensing ambient light conditions in the room, and a motion detector for detecting occupancy of the room, and wherein the programmable logic control unit is responsive to the sensed ambient light conditions and the detected occupancy.

32. The system of claim 24, further comprising means for manually overriding the programmable logic control unit for operating at least one of the lighting system or the actuator.

33. The system of claim 24, wherein each cornice includes a front panel, a pair of side panels and a pair of corner joining assemblies joining the front panels with each of the pair of side panels.

34. The system of claim 33, wherein each corner joining assembly comprises a bracket including a first face and a second face disposed at 90° from the first face, the first face secured to a back side of the front panel and the second face secured to a back side of one of the pair of side panels, the first and second faces being joined at an inside edge, the inside edge including at least one hole disposed therein, the joining assembly further comprising a welt disposed between the front panel and the one of the pair of side panels and securely received in the at least one hole.

35. The system of claim 33, wherein the front panel includes two modular panels joined by a splicer.

36. The system of claim 24, further comprising a power cord operatively secured to at least one of the lighting system, the actuator and the logic control unit in at least one of the cornices for supplying power to the system.

37. The system of claim 36, further comprising an extension power cord including a male receptacle on one end thereof adapted to be inserted in a female receptacle operatively connected to one of said cornices, and a female receptacle on the other end thereof adapted to be inserted in a male receptacle operatively connected to another of said cornices.

38. The system of claim 24, further comprising an extension power cord including a male receptacle on one end thereof adapted to be inserted in a female receptacle operatively connected to one of said cornices, and a female receptacle on the other end thereof adapted to be inserted in a male receptacle operatively connected to another of said cornices.

* * * * *